(12) United States Patent
Son et al.

(10) Patent No.: US 12,314,088 B2
(45) Date of Patent: May 27, 2025

(54) HINGE APPARATUS AND ELECTRONIC DEVICE INCLUDING THE SAME

(71) Applicant: Samsung Electronics Co., Ltd., Suwon-si (KR)

(72) Inventors: Kwonho Son, Suwon-si (KR); Heecheul Moon, Suwon-si (KR); Jongchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 17/822,378

(22) Filed: Aug. 25, 2022

(65) Prior Publication Data
US 2023/0026358 A1    Jan. 26, 2023

Related U.S. Application Data

(63) Continuation of application No. PCT/KR2022/010537, filed on Jul. 19, 2022.

(30) Foreign Application Priority Data

Jul. 22, 2021  (KR) .......... 10-2021-0096288

(51) Int. Cl.
*E05D 3/06*   (2006.01)
*F16C 11/04*  (2006.01)
(Continued)

(52) U.S. Cl.
CPC ............ *G06F 1/1681* (2013.01); *F16C 11/04* (2013.01); *E05D 3/122* (2013.01); *E05Y 2999/00* (2024.05)

(58) Field of Classification Search
CPC ........ G06F 1/16; G06F 1/1616; G06F 1/1681; G06F 1/166; G06F 1/1679; H04M 1/022;
(Continued)

(56) References Cited

U.S. PATENT DOCUMENTS 9,848,502 B1 * 12/2017 Chu ............... G06F 1/1681
10,037,058 B2    7/2018 Kato
(Continued)

FOREIGN PATENT DOCUMENTS

JP       2020133853 A    8/2020
KR  10-2012-0081502 A    7/2012
(Continued)

OTHER PUBLICATIONS

International Search Report and Written Opinion of the International Searching Authority dated Oct. 19, 2022, in connection with International Application No. PCT /KR2022/010537, 10 pages.

*Primary Examiner* — Chuck Y Mah

(57) ABSTRACT

An electronic device according to various embodiments disclosed herein may include a first housing, a second housing, and a hinge that foldably connect the first housing and the second housing, wherein the hinge may include a hinge bracket, a first arm coupled to the first housing, and a multi-link structure including a plurality of rotation shafts and a plurality of links connecting the plurality of rotation shafts and configured to rotatably connect the hinge bracket and the first arm to each other. Various other embodiments may be possible.

17 Claims, 21 Drawing Sheets

(51) Int. Cl.
*G06F 1/16* (2006.01)
*E05D 3/12* (2006.01)

(58) Field of Classification Search
CPC ............ H04M 1/0214; H04M 1/0216; H04M
1/0222; H05K 5/0226; F16M 11/10;
F16C 11/04; E05D 11/1021; E05D
11/1078; E05D 11/082; E05D 3/14; E05D
3/18; E05D 3/122; E05D 3/12; E05D
3/16; E05D 3/06; E05D 3/32; E05D
15/28; E05D 15/30; E05D 15/32; E05D
15/40; E05D 1/04; E05D 2001/045; E05Y
2999/00
See application file for complete search history.

(56) References Cited

U.S. PATENT DOCUMENTS

| | | | |
|---|---|---|---|
| 10,401,917 B1* | 9/2019 | Dai | ............... G06F 1/1679 |
| 10,754,394 B2 | 8/2020 | Aagaard et al. | |
| 10,802,551 B1 | 10/2020 | Lin et al. | |
| 10,890,951 B1* | 1/2021 | Watamura | ............ G06F 1/1681 |
| 11,016,530 B2 | 5/2021 | Watamura et al. | |
| 2015/0362956 A1 | 12/2015 | Tazbaz | |
| 2017/0328102 A1* | 11/2017 | Kato | ................... E05D 11/1078 |
| 2018/0059740 A1 | 3/2018 | Kato | |
| 2018/0067520 A1* | 3/2018 | Määttä | .................. G06F 1/1681 |
| 2019/0274227 A1* | 9/2019 | Hsu | .................. H05K 5/0226 |
| 2020/0097051 A1* | 3/2020 | Liu | ..................... G06F 1/1652 |
| 2020/0291702 A1* | 9/2020 | Hsu | ..................... G06F 1/1681 |
| 2020/0392983 A1* | 12/2020 | Chang | ..................... F16C 11/04 |
| 2021/0067614 A1* | 3/2021 | Cheng | .................. G06F 1/1681 |
| 2021/0365078 A1* | 11/2021 | Chen | ......................... E05D 3/18 |
| 2022/0113769 A1* | 4/2022 | Kinoshita | ............. E05D 11/082 |
| 2023/0004197 A1* | 1/2023 | Lin | ...................... G06F 1/1616 |
| 2023/0027462 A1* | 1/2023 | Hsu | ..................... G06F 1/1618 |
| 2024/0040725 A1* | 2/2024 | Wang | ..................... H04M 1/02 |
| 2024/0044360 A1* | 2/2024 | Zhang | .................. H04M 1/022 |

FOREIGN PATENT DOCUMENTS

| | | |
|---|---|---|
| KR | 10-2017-0018430 A | 2/2017 |
| KR | 20180094172 A | 8/2018 |
| KR | 20180138494 A | 12/2018 |
| KR | 10-1992014 B1 | 6/2019 |
| KR | 20190097898 A | 8/2019 |
| KR | 102152040 B1 | 9/2020 |
| KR | 20200117777 A | 10/2020 |
| KR | 10-2021-0054767 A | 5/2021 |

* cited by examiner

HINGE APPARATUS AND ELECTRONIC DEVICE INCLUDING THE SAME

CROSS-REFERENCE TO RELATED APPLICATIONS

This application is a bypass continuation of International Application No. PCT/KR2022/010537, filed Jul. 19, 2022, which claims priority to Korean Patent Application No. 10-2021-0096288, filed Jul. 22, 2021, the disclosures of which are herein incorporated by reference in their entirety.

BACKGROUND

1. Field

Various embodiments disclosed herein relate to a hinge apparatus and an electronic device including the hinge apparatus.

2. Description of Related Art

Hinge structures are widely used across overall industry as structures for rotatably connecting mechanical parts. For example, a hinge structure may be applied to a foldable electronic device.

With the technological development of components included in electronic devices, various types of electronic devices are being developed. In particular, as a foldable display has been developed with the technological development of displays that visually display information, new-concept electronic devices are emerging.

For example, a foldable electronic device may be implemented by applying a foldable display. As electronic devices having a new form factor appear, there has also been an increasing demand for development of technology for components rotatably connecting the housings of the electronic devices.

SUMMARY

A foldable display may have a predetermined radius of curvature in a folded state. A deformation point at which the foldable display is actually folded may exist in a display area. Designing a rotation shaft to be directly arranged in the display area may be difficult due to interference with the space occupied by the display.

In order to solve this problem, it is necessary to design the rotation axis to be spaced apart from the deformation point of the display, and to design mechanical parts supporting the display and rotated by the rotation axis to move along a rotation trajectory according to the deformation of the display.

Various embodiments presented herein are capable of providing a hinge having a novel structure that can support effective display folding in an electronic device including a foldable display and an electronic device including the same.

An electronic device according to various embodiments disclosed herein may include a first housing, a second housing, and a hinge that foldably connect the first housing and the second housing, wherein the hinge may include a hinge bracket, a first arm coupled to the first housing, and a multi-link structure including a plurality of rotation shafts and a plurality of links connecting the plurality of rotation shafts and configured to rotatably connect the hinge bracket and the first arm.

An electronic device according to various embodiments disclosed herein may include a first housing, a second housing, a hinge configured to foldably connect the first housing and the second housing, and a flexible display at least partially supported by the first housing and the second housing and at least partially bent in a process of folding the first housing and the second housing, wherein the inspection may include a hinge bracket, a first arm coupled to the first housing, and a multi-link structure including a plurality of rotation shafts and a plurality of links connecting the plurality of rotation shafts and configured to rotatably connect the hinge bracket and the first arm.

An electronic device according to various embodiments disclosed herein may include a first housing, a second housing, and a hinge that foldably connect the first housing and the second housing, wherein the hinge may include a hinge bracket, a first arm coupled to the first housing, a second arm coupled to the second housing, and a multi-link structure including a plurality of rotation shafts and a plurality of links connecting the plurality of rotation shafts and configured to rotatably connect the hinge bracket and the first and second arms.

According to various embodiments disclosed herein, it is possible to manufacture a compact hinge by implementing the hinge having a relatively simple structure. As a result, it is possible to reduce the volume of a hinge driving part of an electronic device, and thus to manufacture an electronic device that is compact as a whole.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In connection with the description of the drawings, the same or similar components may be denoted by the same or similar reference numerals.

DETAILED DESCRIPTION

Figure 1:
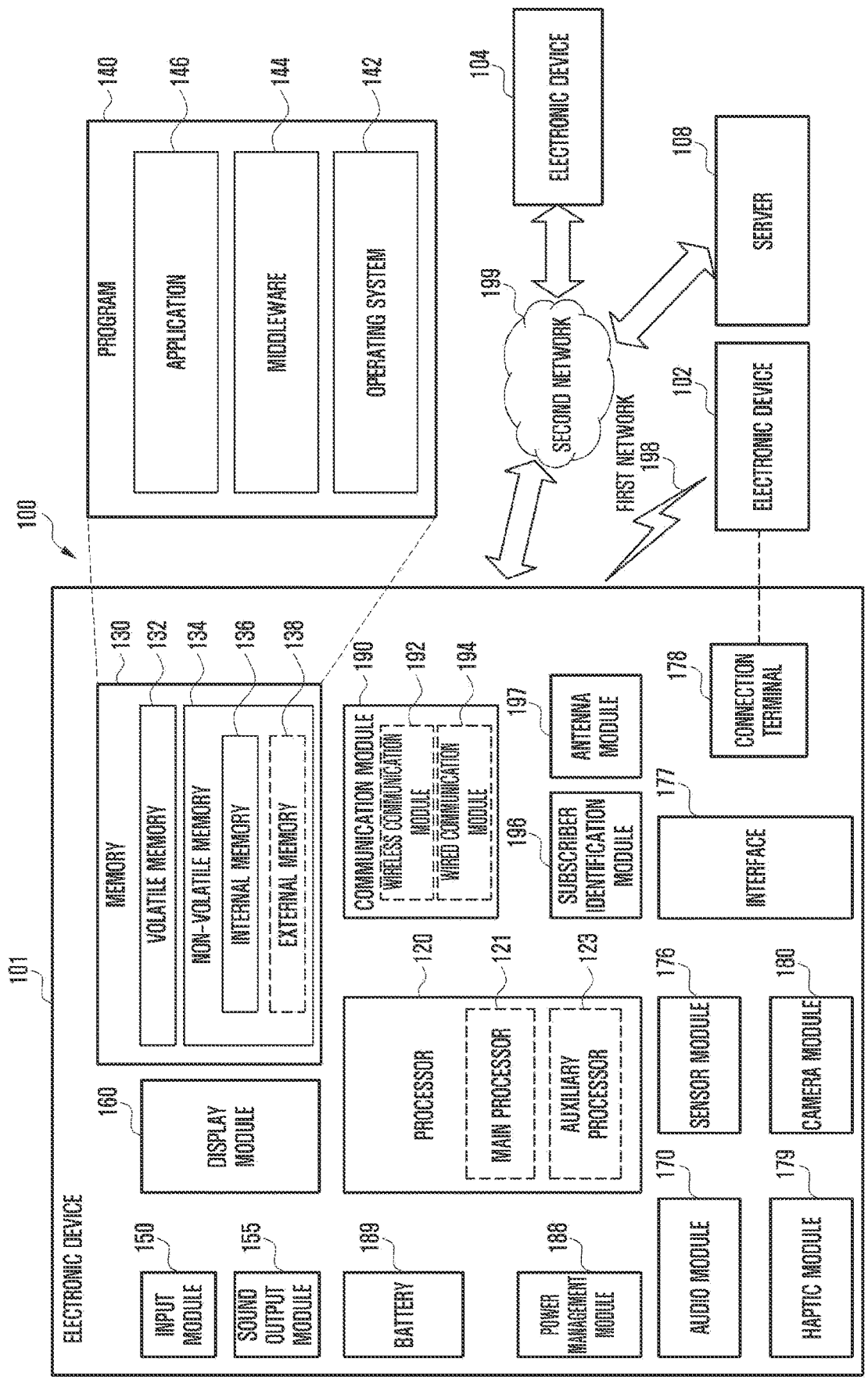
FIG. 1 is a block diagram illustrating an electronic device 101 in a network environment 100 according to various embodiments.

FIGS. 1 through 10A, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134 including an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
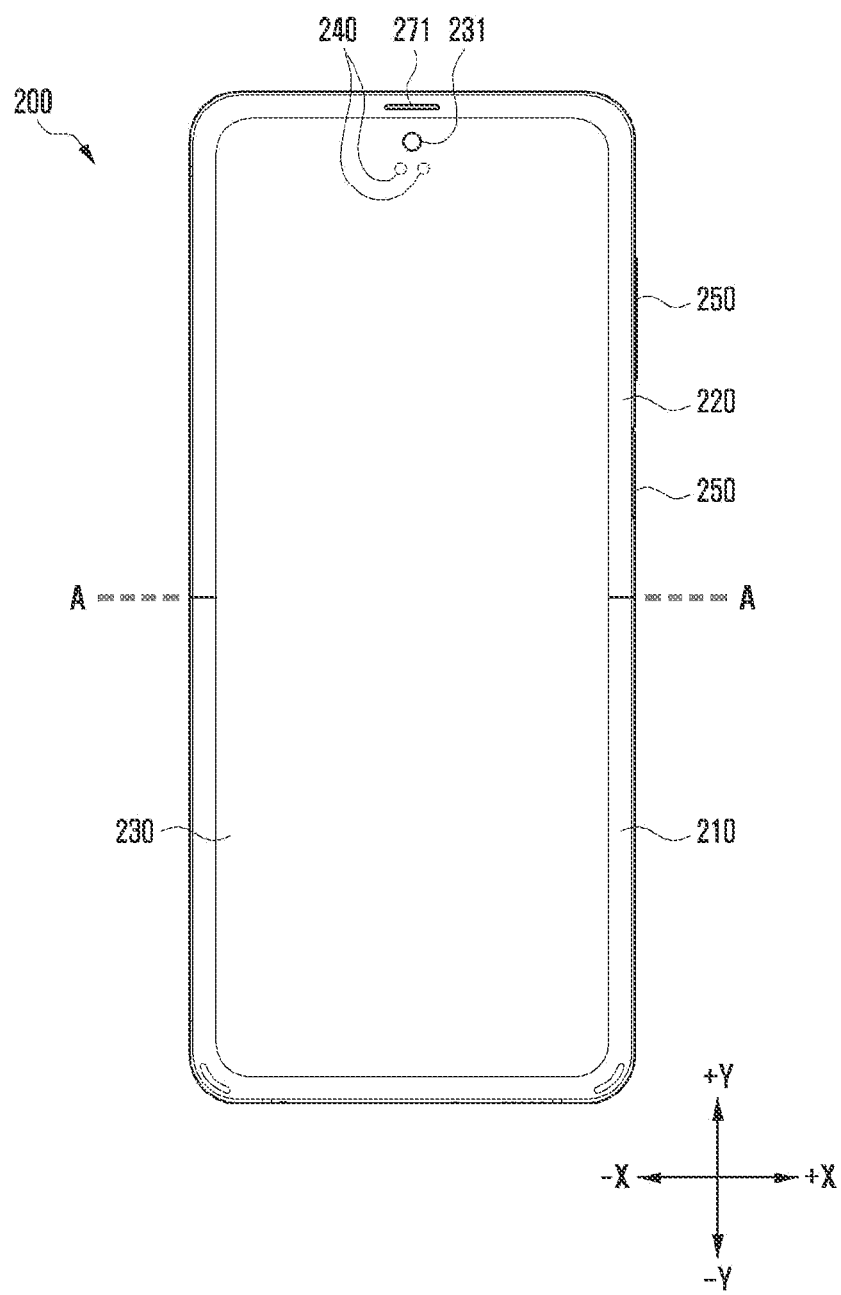
FIG. 2A is a front view of an electronic device according to various embodiments disclosed herein.
Figure 2B:
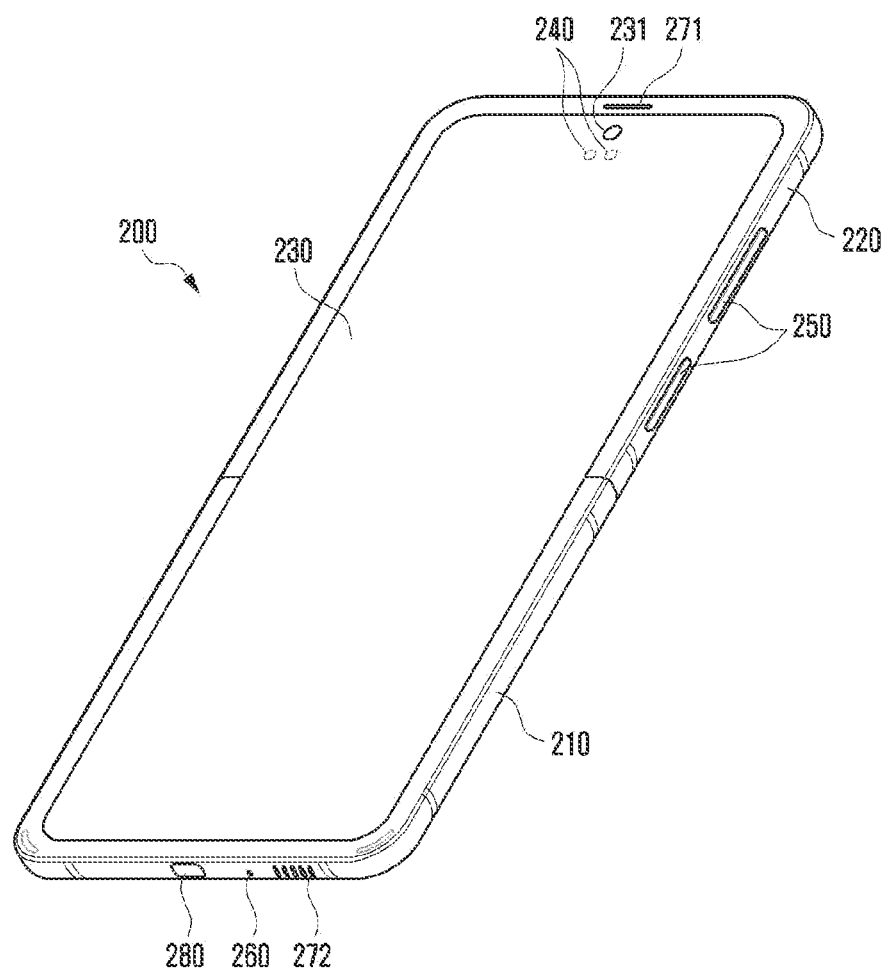
FIG. 2B is a perspective view of the electronic device according to various embodiments disclosed herein.
Figure 2C:
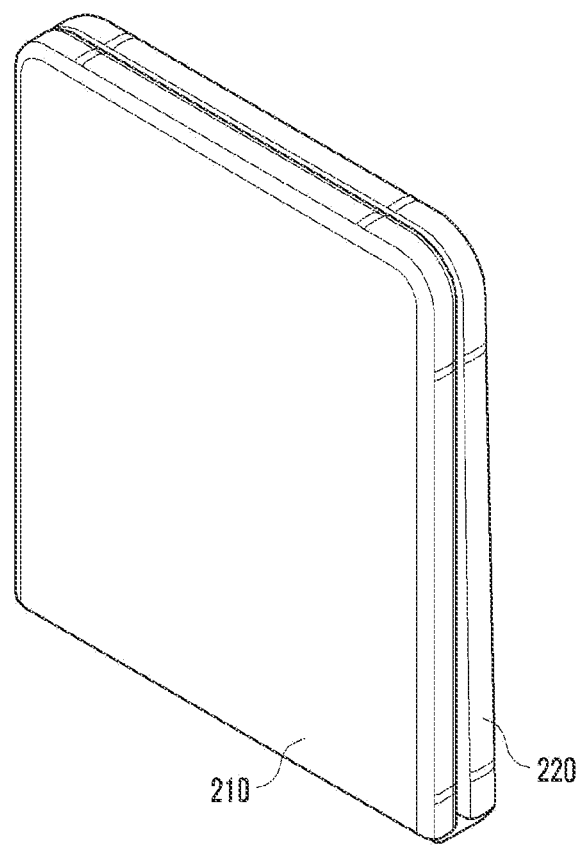
FIG. 2C is a perspective view of the electronic device according to various embodiments disclosed herein in a folded state.

FIG. 2A is a front view of an electronic device according to various embodiments disclosed herein. FIG. 2B is a perspective view of the electronic device according to various embodiments disclosed herein. FIG. 2C is a perspective view of the electronic device according to various embodiments disclosed herein in a folded state.

According to various embodiments, the electronic device 200 illustrated in FIGS. 2A to 2C may be an embodiment of the electronic device 101 described above with reference to FIG. 1. The electronic device 200 described below may include at least some of the components illustrated in FIG. 1.

According to various embodiments, the electronic device 200 may include a first housing 210 and a second housing 220. The first housing 210 and the second housing 220 may be foldably connected. For example, as illustrated in FIG. 2C, when the first housing 210 and the second housing 220 are folded, the overall shape of the electronic device 200 may be changed. In certain embodiments, the first housing 210 and the second housing 220 may be folded about an axis (e.g., the axis A-A in FIG. 2A) parallel to the width direction (e.g., the X-axis direction in FIG. 2A) of the electronic device 200. In certain embodiments, the first housing 210 and the second housing 220 may be folded about an axis parallel to the longitudinal direction (e.g., the Y-axis direction in FIG. 2A) of the electronic device 200.

According to various embodiments, the electronic device 200 may include a display module 230 (e.g., the display module 160 in FIG. 1) supported by the first housing 210 and the second housing 220. The display module 230 may include all of various devices capable of displaying visual information. In certain embodiments, at least a portion of the display module 230 may be folded due to the folding of the first housing 210 and the second housing 220. Here, the folding of the display module 230 may include both a completely folded deformation and a deformation bent while maintaining a predetermined curvature.

According to various embodiments, the display module 230 may be a flexible display in which at least a partial area can be folded. In certain embodiments, the substrate of the display module 230 may be formed of a flexible material. For example, the substrate of the display module 230 may be formed of a polymer material, such as polyethylene terephthalate (PET), polyimide (PI), or glass, processed to a very small thickness.

Referring to FIG. 2C, in the folded state of the electronic device 200, the first housing 210 and the second housing 220 may be in the state of substantially facing each other. In this way, since the electronic device 200 can be folded to improve portability, it may be possible to make the electronic device 200 including a large-area display module 230 more compact. In addition, since a portion of the display module 230 exposed to the outside is reduced in the folded state as in FIG. 2C, damage or contamination of the display module 230 can be reduced.

According to various embodiments, the display module 230 may include a hole 231 for transmitting external light to a camera module (e.g., the camera module 180 in FIG. 1) that may be disposed on the rear surface of the display module 230. For example, as illustrated in FIG. 2A, the hole 231 for transmitting light to the camera module may be located at the upper end of the display module 230. In certain embodiments, various sensor modules 240 related to light (e.g., an infrared sensor and an illuminance sensor) may be disposed around the hole 231.

According to various embodiments, the electronic device 200 may include a physical button 250 capable of generating an electrical signal when pressed by an external force. For example, as illustrated in FIGS. 2A and 2B, at least one physical button 250 may be disposed on a side surface of the electronic device 200.

According to various embodiments, the electronic device 200 may include a microphone hole 260 and speaker holes 271 and 272. The microphone hole 260 may include a microphone disposed therein to acquire external sound, and in some embodiments, a plurality of microphones may be disposed therein to be able to detect the direction of sound. The speaker holes 271 and 272 may include an external speaker hole 272 and a phone call receiver hole 271. In some embodiments, the speaker holes 271 and 272 and the microphone hole 260 may be implemented as a single hole, or a speaker (e.g., a piezo speaker) may be included without including the speaker holes 271 and 272.

According to various embodiments, the electronic device 200 may include a connection interface 280 (e.g., the interface 177 in FIG. 1). The connection interface 280 may include, for example, a high-definition multimedia interface (HDMI), a universal serial bus (USB) interface, an SD card interface, and/or an audio interface. In certain embodiments, the connection interface 280 may electrically or physically connect the electronic device 200 to an external electronic device, and may include a USB connector, an SD card/MMC connector, or an audio connector. For example, as illustrated in FIG. 2B, a connection interface 280 that can be connected to an external electronic device (e.g., another electronic device, a charging device, or an audio device) may be disposed at the lower end of the electronic device 200.

The electronic device 300 described below may include the electronic devices 101 and 200 described above with reference to FIGS. 1 and 2A to 2C. The electronic device 300 according to various embodiments disclosed herein may include a foldable structure similar to the electronic device 200 described above with reference to FIGS. 2A to 2C. In the following description, the unfolded state of the electronic device 200 as illustrated in FIG. 2B will be described as an "unfolded state", and the folded state of the electronic device 200 as illustrated in FIG. 2C will be described as a "folded state". The electronic device 200 of FIGS. 2A to 2C is an electronic device 200 that is folded about an axis (e.g., line A-A in FIG. 2A) parallel to the horizontal direction (e.g., the X-axis direction in FIG. 2A) of the display 230. The electronic device 300 disclosed herein may also include an electronic device 300 that is folded about an axis parallel to the vertical direction (e.g., the Y-axis direction of FIG. 3) of the display 340.

Figure 3:
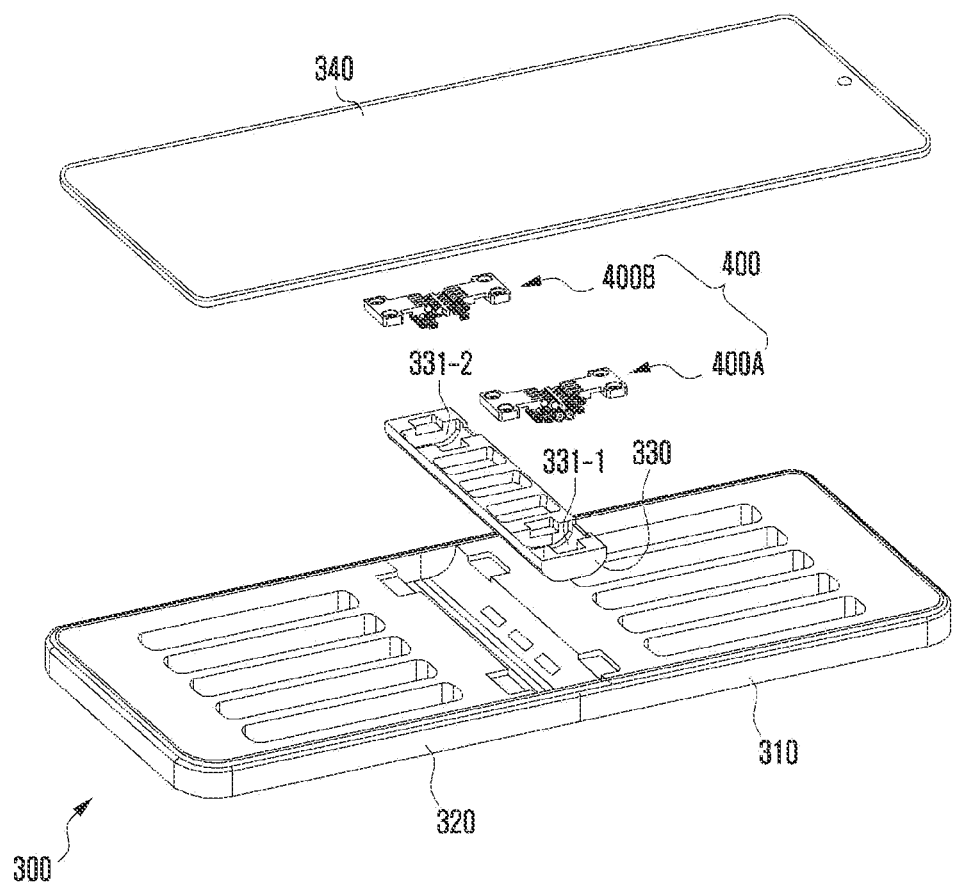
FIG. 3 is a perspective view illustrating the electronic device according to various embodiments.
Figure 4A:
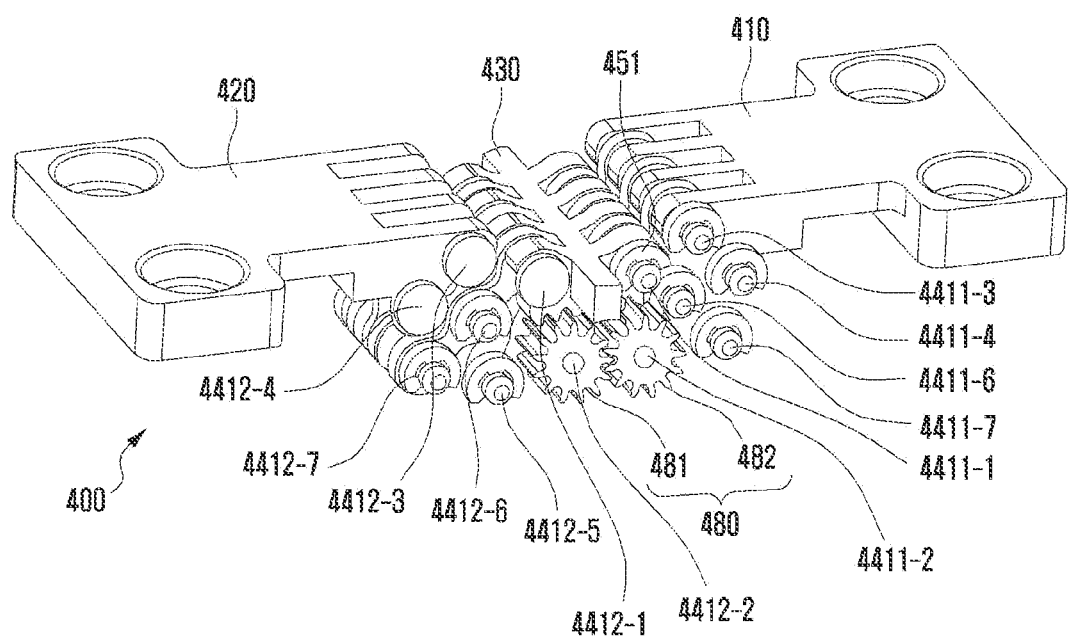
FIG. 4A is a perspective view of a hinge according to various embodiments disclosed herein.
Figure 4A:
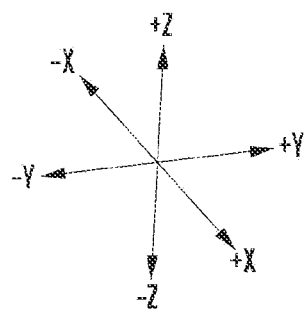
Figure 4B:
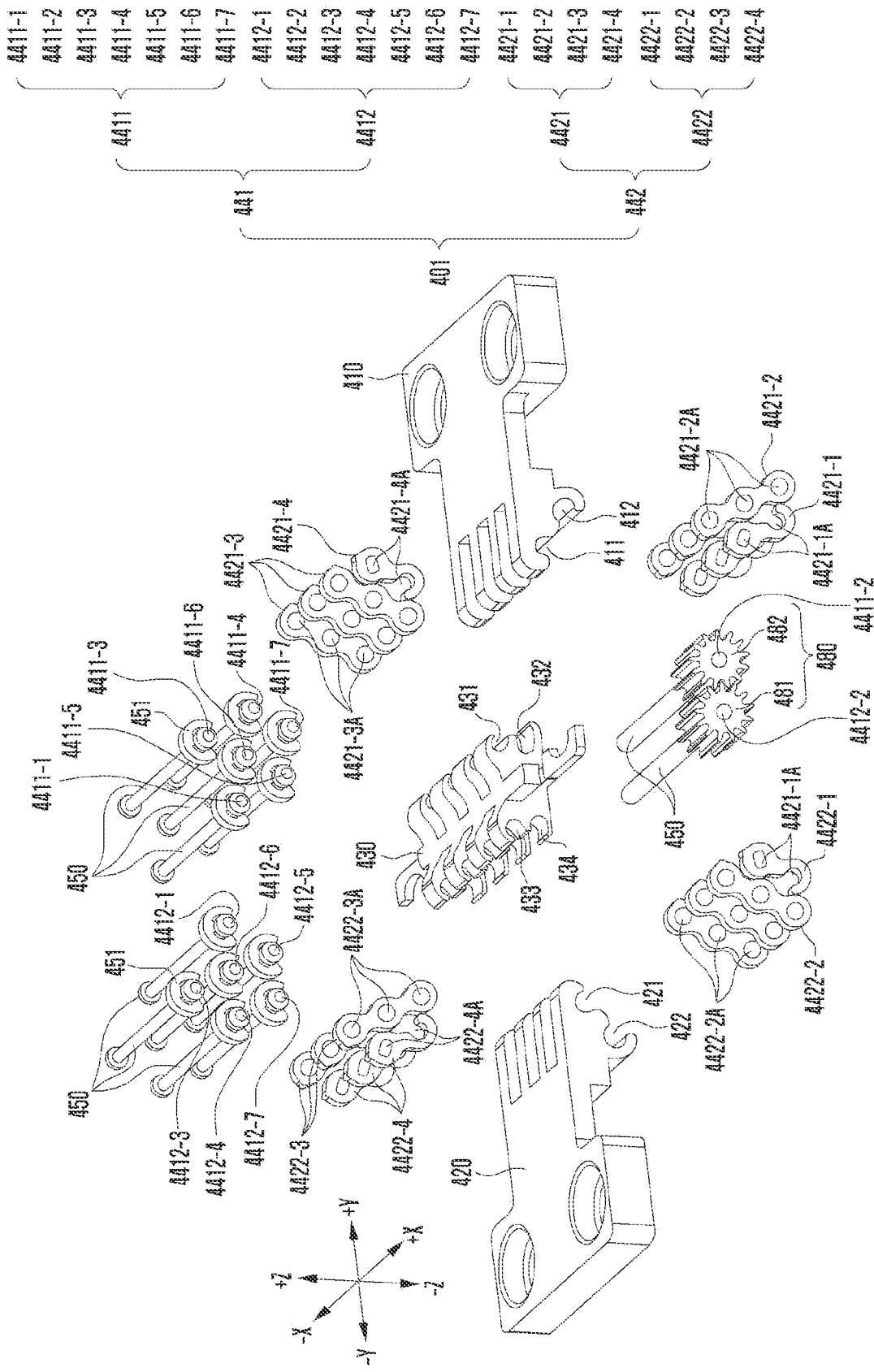
FIG. 4B is an exploded perspective view of the hinge according to various embodiments disclosed herein.
Figure 5A:
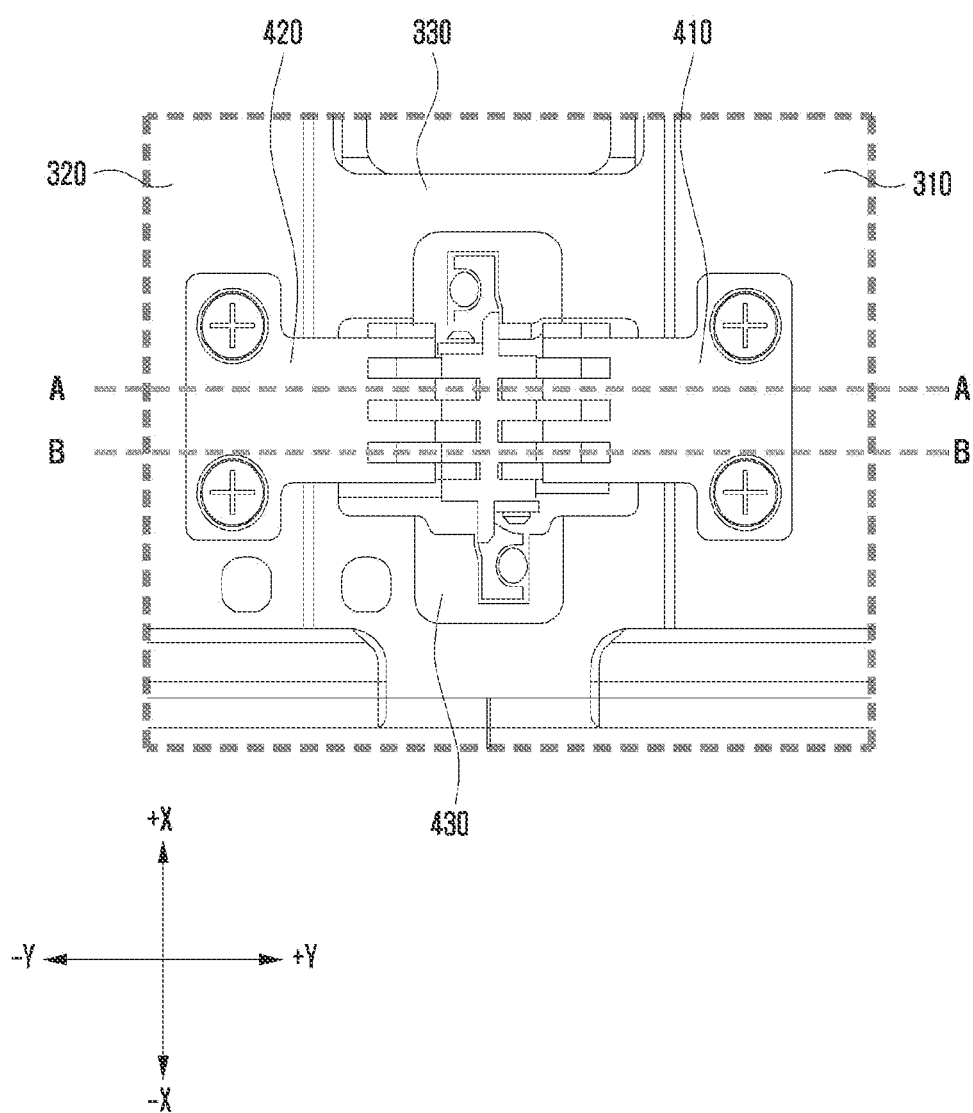
FIG. 5A is a plan view of a hinge according to various embodiments disclosed herein.
Figure 5B:
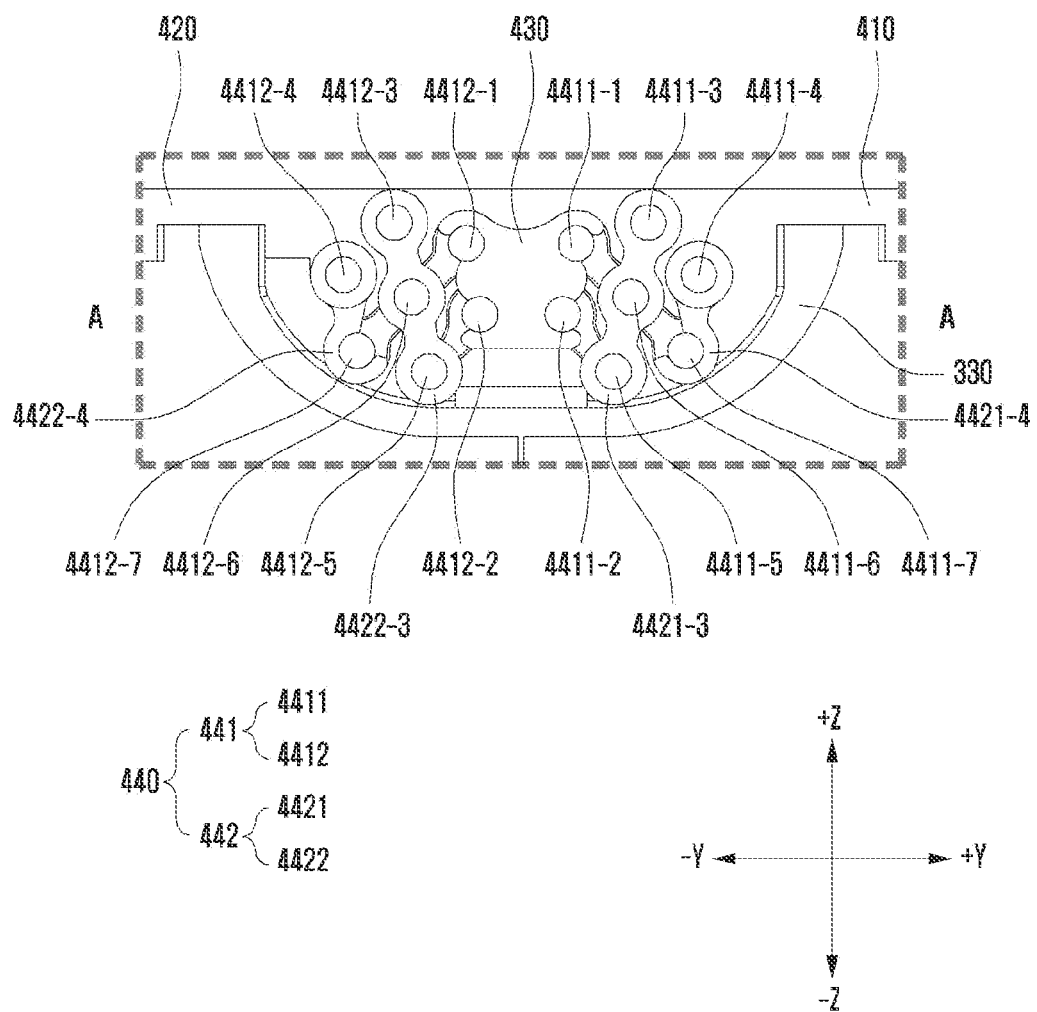
FIG. 5B is a cross-sectional view taken along line A-A of the hinge illustrated in FIG. 5A.
Figure 5C:
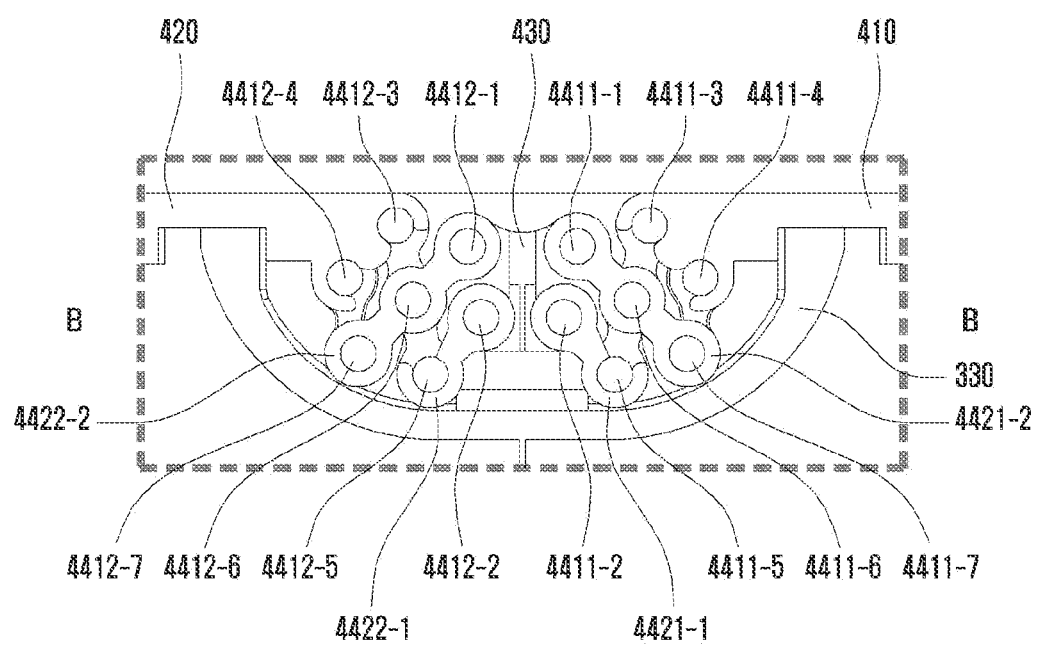
FIG. 5C is a cross-sectional view taken along line B-B of the hinge illustrated in FIG. 5A.

FIG. 3 is a perspective view illustrating the electronic device according to various embodiments. FIG. 4A is a perspective view of a hinge according to various embodiments disclosed herein. FIG. 4B is an exploded perspective view of the hinge according to various embodiments disclosed herein. FIG. 5A is a plan view of a hinge according to various embodiments disclosed herein. FIG. 5B is a cross-sectional view taken along line A-A of the hinge illustrated in FIG. 5A. FIG. 5C is a cross-sectional view taken along line B-B of the hinge illustrated in FIG. 5A.

Referring to FIG. 3, in various embodiments disclosed herein, the electronic device 300 may include a first housing 310, a second housing 320, a hinge housing 330, and a display 340. The hinge housing 330 may be disposed between the first housing 310 and the second housing 320.

The first housing 310 and the second housing 320 may be foldably connected by a hinge 400 disposed in the hinge housing 330. When the first housing 310 and the second housing 320 are folded or unfolded by the operation of the hinge 400, the electronic device 300 may be switched from the unfolded state to the folded state or from the folded state to the unfolded state.

In certain embodiments, the hinge housing 330 may support at least some of the components of the hinge 400. Referring to FIG. 3, the hinge housing 330 may be installed between the first housing 310 and the second housing 320. When viewed in the Z-axis direction with reference to FIG. 3, the first housing 310, and the second housing 320, and the hinge housing 330 may be disposed to partially overlap each other. For example, when the electronic device 300 is in the unfolded state, the hinge housing 330 may be hidden by the first housing 310 and the second housing 320 in the rear direction of the electronic device 300 (e.g., the −Z direction in FIG. 3) to be at least partially invisible. As illustrated in FIG. 3, the external shape of the hinge housing 330 may be at least partially configured in a round shape to allow rotation of the first housing 310 and the second housing 320. In certain embodiments, the hinge housing 330 may include at least one accommodation portion 331. The hinge housing 330 may include a plurality of accommodation portions 331 provided in the folding axis direction of the electronic device 300 (e.g., the X-axis direction in FIG. 3). The accommodation portion 331 may be an internal space concavely formed in the hinge housing 330. The hinge 400 may be disposed in the accommodation portion 331. A plurality of hinges 400 may be provided and disposed respectively in the accommodating portions 331 provided at different positions. For example, as illustrated in FIG. 3, a first hinge 400A may be disposed in a first accommodation portion 331-1, and a second hinge 400B may be disposed in a second accommodation portion 331-2.

In certain embodiments, the display 340 may be partially supported by the first housing 310 and partially supported by the second housing 320. The display 340 may be a foldable display (flexible display) 340 at least partially formed of a flexible material. In the folded state, a portion of the display 340 may be deformed and folded.

The hinge 400 according to various embodiments disclosed herein may foldably connect the first housing 310 and the second housing 320. In certain embodiments, the hinge 400 may include a hinge bracket 430, a first arm 410, a second arm 420, and a multi-link structure 401.

According to various embodiments, the hinge bracket 430 may be a mechanical part fixed to the hinge housing 330. In certain embodiments, the hinge bracket 430 may be arranged in the hinge housing 330 such that the center thereof is aligned with the folding axis (e.g., the A-A axis in FIG. 2A) of the electronic device 300. A plurality of bracket insertion holes 431, 432, 433, and 434 may be provided in the hinge bracket 430. The bracket insertion holes 431, 432, 433, and 434 may be holes provided in the folding axis direction of the electronic device 300 (e.g., the X-axis direction of FIG. 4B). For example, as illustrated in FIG. 4B, four bracket insertion holes 431, 432, 433, 434 may be provided. The bracket insertion holes 431, 432, 433, and 434 may be provided at positions in a symmetrical arrangement with respect to the center of the hinge bracket 430. Referring to FIG. 4B, the bracket insertion holes 431 and 432 provided in a first direction (e.g., the +Y direction in FIG. 4B) with respect to the center of the hinge bracket 430 and the bracket insertion holes 433 and 434 provided in a second direction (e.g., the −Y direction in FIG. 4B) opposite to the first direction with respect to the center of the hinge bracket 430 may be disposed at positions in a symmetrical arrangement with respect to the center of the hinge bracket 430. The bracket insertion holes 431 and 432 provided in the first direction with respect to the center of the hinge bracket 430 may include a first bracket insertion hole 431 and a second bracket insertion hole 432 provided at different positions. The bracket insertion holes 433 and 434 provided in the second direction with respect to the center of the hinge bracket 430 may include a third bracket insertion hole 433 and a fourth bracket insertion hole 434 provided at different positions. Shafts 450 may be inserted into the bracket insertion holes 431, 432, 433, and 434, respectively. Stoppers 451 may be fitted and fixed to the distal ends of the shafts 450, respectively, in order to prevent the shafts 450 from separating in the axial direction.

According to various embodiments, the first arm 410 may be disposed to be partially accommodated in the accommodation portion 331 of the hinge housing 330. The first arm 410 may be coupled to the first housing 310. Accordingly, the first housing 310 may move together with the first arm 410. The first arm 410 the first housing 310 may be coupled in various ways. For example, the first arm 410 and the first housing 310 may be coupled through bolt coupling. In addition, the first arm 410 and the first housing 310 may be coupled by various methods that can be easily conceived by a person ordinarily skilled in the art (e.g., welding, bonding, riveting, and press-fitting). The first arm 410 may be disposed in a first direction with respect to the hinge bracket 430. The first arm 410 may be rotatable with respect to the hinge bracket 430. When the first arm 410 rotates with respect to the hinge bracket 430, the first housing 310 coupled to the first arm 410 is rotatable with respect to the hinge bracket 430.

In certain embodiments, one or more first arm insertion holes 411 and 412 may be provided in the first arm 410. The first arm insertion holes 411 and 412 may be holes provided in the folding axis direction of the electronic device 300 (e.g., the X-axis direction of FIG. 4B). For example, as illustrated in FIG. 4B, the first arm 410 may include two first arm insertion holes (the (1-1)th arm insertion hole 411 and the (1-2)th arm insertion hole 412) provided at different positions. The shafts 450 may be inserted into the first arm insertion holes 411 and 412, respectively. Stoppers 451 may be fitted and fixed to the distal ends of the shafts 450, respectively, in order to prevent the shafts 450 from separating in the axial direction.

According to various embodiments, the second arm 420 may be disposed to be partially accommodated in the accommodation portion 331 of the hinge housing 330. The second arm 420 may be coupled to the second housing 320. Accordingly, the second housing 320 may move together with the second arm 420. The second arm 420 and the second housing 320 may be coupled in various ways. For example, the second arm 420 and the second housing 320 may be coupled through bolt coupling. In addition, the second arm 420 and the second housing 320 may be coupled by various methods that can be easily conceived by a person ordinarily skilled in the art (e.g., welding, bonding, riveting, and press-fitting). The second arm 420 may be disposed in a second direction with respect to the hinge bracket 430. The second arm 420 may be rotatable with respect to the hinge bracket 430. When the second arm 420 rotates with respect to the hinge bracket 430, the second housing 320 coupled to the second arm 420 is rotatable with respect to the hinge bracket 430.

In certain embodiments, one or more second arm insertion holes 421 and 422 may be provided in the second arm 420. The second arm insertion holes 421 and 422 may be holes provided in the folding axis direction of the electronic device 300 (e.g., the X-axis direction of FIG. 4B). For example, as illustrated in FIG. 4B, the second arm 420 may include two second arm insertion holes (the (2-1)th arm insertion hole 421 and the (2-2)th arm insertion hole 422) provided at different positions. The shafts 450 may be inserted into the second arm insertion holes 421 and 422, respectively. Stoppers 451 may be fitted and fixed to the distal ends of the shafts 450, respectively, in order to prevent the shafts 450 from separating in the axial direction.

In certain embodiments, the multi-link structure 401 may refer to a set of components that rotatably connect the first arm 410 and the second arm 420 to the hinge bracket 430. The multi-link structure 401 may include a plurality of rotation shafts 441 and a plurality of links 442 connecting the plurality of rotation shafts 441.

Referring to FIG. 4B, the plurality of rotation shafts 441 of the multi-link structure 401 may include a first rotation shaft 4411 and a second rotation shaft 4412. The plurality of links 442 of the multi-link structure 401 may include a first link 4421 and a second link 4422. The first rotation shaft 4411 and the first link 4421 may be components of the multi-link structure 401 that rotates the first arm 410 relative to the hinge bracket 430. The second rotation shaft 4412 and the second link 4422 may be components of the multi-link structure 401 that rotates the second arm 420 relative to the hinge bracket 430.

First, the multi-link structure 401 that rotates the first arm 410 relative to the hinge bracket 430 will be described.

In various embodiments, the plurality of first links 4421 included in the multi-link structure 401 may be configured in a plate shape extending in a longitudinal direction. The first links 4421 may include a plurality of insertion holes 4421-1A, 4421-2A, 4421-3A, and 4421-4A. The insertion holes 4421-1A, 4421-2A, 4421-3A, and 4421-4A may be holes provided in the first links 4421 to be arranged along the extension direction of the first links 4421. The shafts 450 may be inserted into the insertion holes 4421-1A, 4421-2A, 4421-3A, and 4421-4A, respectively. In certain embodiments, two insertion holes 4421-1A or 4421-4A may be provided in each of the (1-1)th link 4421-1 and the (1-4)th link 4421-4, and three insertion holes 4421-2A or 4421-3A may be formed in each of the (1-2)th link (4421-2) and the (1-3)th link 4421-3. Referring to FIG. 4B, the plurality of first links 4421 may include a (1-1)th link 4421-1, a (1-2)th link 4421-2, a (1-3)th link 4421-3, and a (1-4)th link 4421-4. Referring to FIG. 5A, the plurality of first links 4421 may be alternately disposed along the folding axis of the electronic device 300 (e.g., the X axis in FIG. 5A). For example, as illustrated in FIG. 5, the (1-1)th link 4421-1, the (1-2)th link 4421-2, the (1-3)th link 4421-3, and the (1-4)th link (4421-4) may be spaced apart from each other along the folding axis direction. When divided into a plurality of rows along the folding axis direction, the (1-1)th link 4421-1 and the (1-2)th link 4421-2 are arranged in the same row (e.g., B-B in FIG. 5A and FIG. 5C), the (1-3)th link 4421-3 and the (1-4)th link 4421-4 may be arranged in the same row (e.g., A-A in FIG. 5A and FIG. 5B).

In various embodiments, the plurality of first rotation shafts 4411 included in the multi-link structure 401 may mean shafts that rotate by the shafts 450 inserted into the bracket insertion holes 431, 432, 433, and 434 provided in the hinge bracket 430, the insertion holes 4421-1A, 4421-2A, 4421-3A, and 4421-4A provided in the first link 4421, and the first arm insertion holes 411 and 412 provided in the first arm 410. The first rotation shafts 4411 may include bracket rotation shafts 4411-1 and 4411-2, first arm rotation shafts 4411-3 and 4411-4, and first auxiliary rotation shafts 4411-5, 4411-6, and 4411-7.

In certain embodiments, the bracket rotation shafts 4411-1 and 4411-2 may include a first bracket rotation shaft 4411-1 and a second bracket rotation shaft 4411-2. The first bracket rotation shaft 4411-1 may be a shaft that is rotated by the shaft 450 inserted into the first bracket insertion hole 431 and the insertion hole 4421-2A provided in the (1-2)th link 4421-2. The second bracket rotation shaft 4411-2 may be a shaft that is rotated by the shaft 450 inserted into the second bracket insertion hole 432 and the insertion hole 4421-1A provided in the (1-1)th link 4421-1. The bracket rotation shafts 4411-1 and 4411-2 are rotation shafts 441 rotated by the shafts 450 inserted into the bracket insertion holes 431 and 432 provided in the hinge bracket 430 fixed to the hinge housing 330, and thus may be rotation shafts 441 the positions of which are fixed in the process of folding the electronic device 300.

In certain embodiments, the first arm rotation shafts 4411-3 and 4411-4 may include a (1-1)th arm rotation shaft 4411-3 and a (1-2)th arm rotation shaft 4411-4. The (1-1)th arm rotation shaft 4411-3 may be a shaft that is rotated by the shaft 450 inserted into the (1-1)th arm insertion hole 411 and the insertion hole 4421-3A provided in the (1-3)th link 4421-3. The (1-2)th arm rotation shaft 4411-4 may be a shaft that is rotated by the shaft 450 inserted into the (1-2)th arm insertion hole 412 and the insertion hole 4421-4A provided in the (1-4)th link 4421-4.

In certain embodiments, the first auxiliary rotation shafts 4411-5, 4411-6, and 4411-7 may be rotation shafts 441 rotatably connecting the first links 4421. The first auxiliary rotation shafts 4411-5, 4411-6, and 4411-7 may be disposed in the accommodation portion 331 of the hinge housing 330. The first auxiliary rotation shafts 4411 may include a (1-1)th auxiliary rotation shaft 4411-5, a (1-2)th auxiliary rotation shaft 4411-6, and a (1-3)th auxiliary rotation shaft 4411-7. The (1-1)th auxiliary rotation shaft 4411-5 may be a shaft that is rotated by the shaft 450 inserted into an insertion hole provided in the (1-1)th link 4421-1 and an insertion hole provided in the (1-3)th link 4421-3. The (1-2)th auxiliary rotation shaft 4411-6 may be a shaft that is rotated by the shaft 450 inserted into an insertion hole provided in the (1-2)th link 4421-2 and an insertion hole provided in the (1-3)th link 4421-3. The (1-3)th auxiliary rotation shaft 4411-7 may be a shaft that is rotated by the shaft 450 inserted into an insertion hole provided in the (1-2)th link 4421-2 and an insertion hole provided in the (1-4)th link 4421-4.

In certain embodiments, the (1-1)th link 4421-1 may connect the second bracket rotation shaft 4411-2 and the (1-1)th auxiliary rotation shaft 4411-5. The (1-2)th link 4421-2 may connect the first bracket rotation shaft 4411-1, the (1-2)th auxiliary rotation shaft 4411-6, and the (1-3)th auxiliary rotation shaft 4411-7 to each other. The (1-3)th link 4421-3 may connect the (1-1)th auxiliary rotation shaft 4411-5, the (1-2)th auxiliary rotation shaft 4411-6, and the (1-1)th arm rotation shaft 4411-3 to each other. The (1-4)th link 4421-4 may connect the (1-3)th auxiliary rotation shaft 4411-7 and the (1-2)th arm rotation shaft 4411-4 to each other.

First, the multi-link structure 401 that rotates the second arm 420 relative to the hinge bracket 430 will be described.

In various embodiments, the plurality of second links 4422 included in the multi-link structure 401 may be configured in a plate shape extending in a longitudinal direction.

The second links 4422 may include a plurality of insertion holes 4422-1A, 4422-2A, 4422-3A, and 4422-4A. The insertion holes 4422-1A, 4422-2A, 4422-3A, and 4422-4A may be holes provided in the second links 4422 to be arranged along the extension direction of the second links 4422. The shafts 450 may be inserted into the insertion holes 4422-1A, 4422-2A, 4422-3A, and 4422-4A, respectively. In certain embodiments, two insertion holes are formed in each of the (2-1)th link 4422-1 and the (2-4)th link 4422-4, and three insertion holes may be formed in each of the (2-2)th link 4422-2 and the (2-3)th link 4422-3. Referring to FIG. 4B, the plurality of second links 4422 may include a (2-1)th link 4422-1, a (2-2)th link 4422-2, a (2-3)th link 4422-3, and a (2-4)th link 4422-4. The plurality of second links 4422 may be alternately disposed along the folding axis of the electronic device 300. For example, as illustrated in FIG. 5A, the (2-1)th link 4422-1 and the (2-2)th link 4422-2 and the (2-3)th link 4422-3 and the (2-4)th link (4422-4) may be disposed to be spaced apart from each other along the folding axis direction. When divided into a plurality of rows along the folding axis direction, the (2-1)th link 4422-1 and the (2-2)th link 4422-2 are arranged in the same row (e.g., B-B in FIG. 5A and FIG. 5C), the (2-3)th link 4422-3 and the (2-4)th link 4422-4 may be arranged in the same row (e.g., A-A in FIG. 5A and FIG. 5B).

In certain embodiments, the second rotation shafts 4412 may include bracket rotation shafts 4412-2 and 4412-2, second arm rotation shafts 4412-3 and 4412-4, and second auxiliary rotation shafts 4412-5, 4412-6, and 4412-7.

In certain embodiments, the bracket rotation shafts 4412-1 and 4412-2 may include a third bracket rotation shaft 4412-1 and a fourth bracket rotation shaft 4412-2. The third bracket rotation shaft 4412-1 may be a shaft that is rotated by the shaft 450 inserted into the third bracket insertion hole 433 and the insertion hole 4422-2A provided in the (2-2)th link 4422-2. The fourth bracket rotation shaft 4412-2 may be a shaft that is rotated by the shaft 450 inserted into the fourth bracket insertion hole 434 and the insertion hole 4422-1A provided in the (2-1)th link 4422-1. The bracket rotation shafts 4412-1 and 4412-2 are rotation shafts 441 rotated by the shafts 450 inserted into the bracket insertion holes 433 and 434 provided in the hinge bracket 430 fixed to the hinge housing 330, and thus may be rotation shafts 441 the positions of which are fixed in the process of folding the electronic device 300.

In certain embodiments, the second arm rotation shafts 4412-3 and 4412-4 may include a (2-1)th arm rotation shaft 4412-3 and a (2-2)th arm rotation shaft 4412-4. The (2-1)th arm rotation shaft 4412-3 may be a shaft that is rotated by the shaft 450 inserted into the (2-1)th arm insertion hole 421 and the insertion hole 4422-3A provided in the (2-3)th link 4422-3. The (2-2)th arm rotation shaft 4412-4 may be a shaft that is rotated by the shaft 450 inserted into the (2-2)th arm insertion hole 422 and the insertion hole 4422-4A provided in the (2-4)th link 4422-4.

In certain embodiments, the second auxiliary rotation shafts 4412-5, 4412-6, and 4412-7 may be rotation shafts 441 rotatably connecting the links 442. The second auxiliary rotation shafts 4412-5, 4412-6, and 4412-7 may be disposed in the accommodation portion 331 of the hinge housing 330. The second auxiliary rotation shafts 4412-5, 4412-6, and 4412-7 may include a (2-1)th auxiliary rotation shaft 4412-5, a (2-2)th auxiliary rotation shaft 4412-6, and a (2-3)th auxiliary rotation shaft 4412-7. The (2-1)th auxiliary rotation shaft 4412-5 may be a shaft that is rotated by the shaft 450 inserted into the insertion hole 4422-1A provided in the (2-1)th link 4422-1 and the insertion hole 4422-3A provided in the (2-3)th link 4422-3. The (2-2)th auxiliary rotation shaft 4412-6 may be a shaft that is rotated by the shaft 450 inserted into the insertion hole 4422-2A provided in the (2-2)th link 4422-2 and the insertion hole 4422-3A provided in the (2-3)th link 4422-3. The (2-3)th auxiliary rotation shaft 4412-7 may be a shaft that is rotated by the shaft 450 inserted into the insertion hole 4422-2A provided in the (2-2)th link 4422-2 and the insertion hole 4422-4A provided in the (2-4)th link 4422-4.

In certain embodiments, the (2-1)th link 4422-1 may connect the fourth bracket rotation shaft 4412-2 and the (2-1)th auxiliary rotation shaft 4412-5 to each other. The (2-2)th link 4422-2 may connect the third bracket rotation shaft 4412-1, the (2-2)th auxiliary rotation shaft 4412-6, and the (2-3)th auxiliary rotation shaft 4412-7 to each other. The (2-3)th link 4422-3 may connect the (2-1)th auxiliary rotation shaft 4412-5, the (2-2)th auxiliary rotation shaft 4412-6, and the (2-1)th arm rotation shaft 4412-3 to each other. The (2-4)th link 4422-4 may connect the (2-3)th auxiliary rotation shaft 4412-7 and the (2-2)th arm rotation shaft 4412-4.

According to various embodiments, the hinge 400 may include an interlocking member 480 that causes the rotation of the first arm 410 to interlock with the rotation of the second arm 420 relative to the hinge bracket 430. For example, the first arm 410 and the second arm 420 may rotate together in a direction in which the electronic device 300 is folded in the process in which the electronic device 300 is switched from the unfolded state to the folded state. Referring to FIG. 4A, the interlocking member 480 may cause the first arm 410 to be interlocked with the second arm 420 such that the first arm 410 and the second arm 420 rotate in opposite directions. The interlocking member 480 may include, for example, gears engaged with each other. In certain embodiments, the gears may be connected to the bracket rotation shafts 4411-1, 4411-2, 4412-1, and 4412-2 to move together. For example, the gears may be fitted to the shafts 450 inserted into the bracket insertion holes 432 and 434 to move together. Referring to FIGS. 4A and 4B, the interlocking member 480 may include a first interlocking gear 481 connected to the second bracket rotation shaft 4411-2 and a second interlocking gear 482 connected to the fourth bracket rotation shaft 4412-2. The first interlocking gear 481 may be engaged with the second interlocking gear 482. The first interlocking gear 481 and the second interlocking gear 482 may rotate in opposite directions by interlocking. Through these opposite rotations, the first arm 410 and the second arm 420 may rotate relative to the hinge bracket 430 in the direction in which the electronic device 300 is folded, or the first arm 410 and the second arm 420 may rotate relative to the hinge bracket 430 in the direction in which the electronic device 300 is unfolded.

Figure 6A:
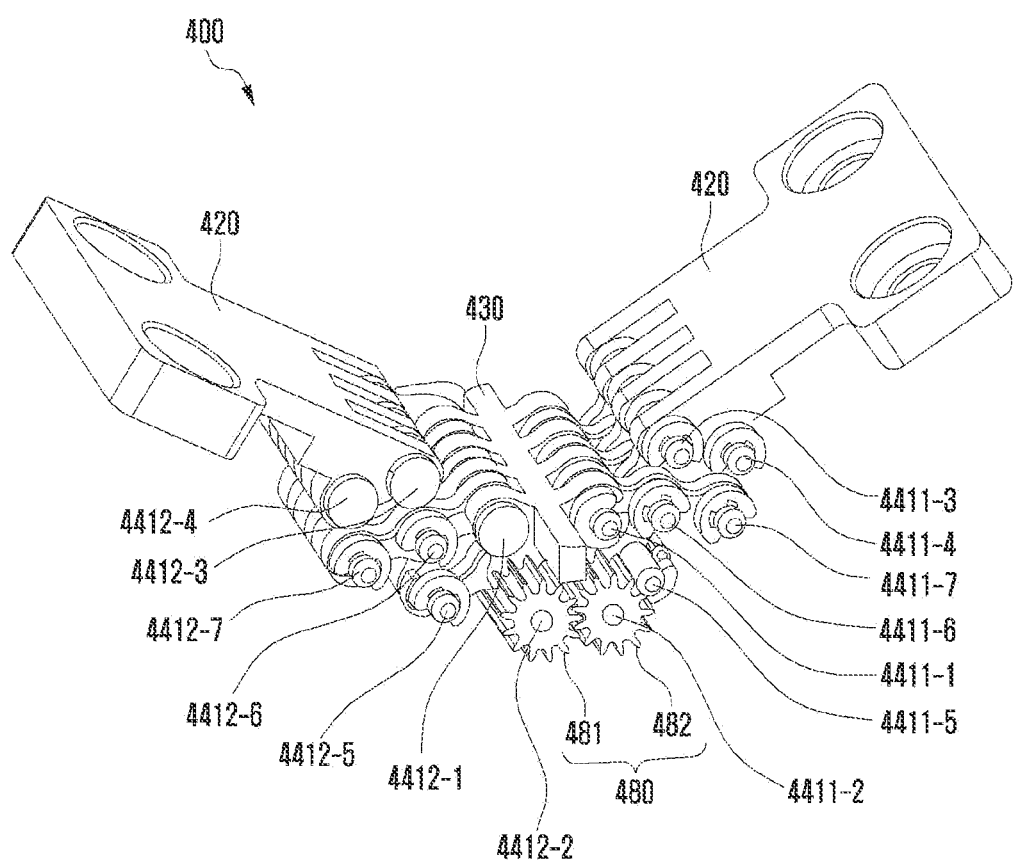
FIG. 6A is a view illustrating an operation state of a hinge according to various embodiments disclosed herein.
Figure 6B:
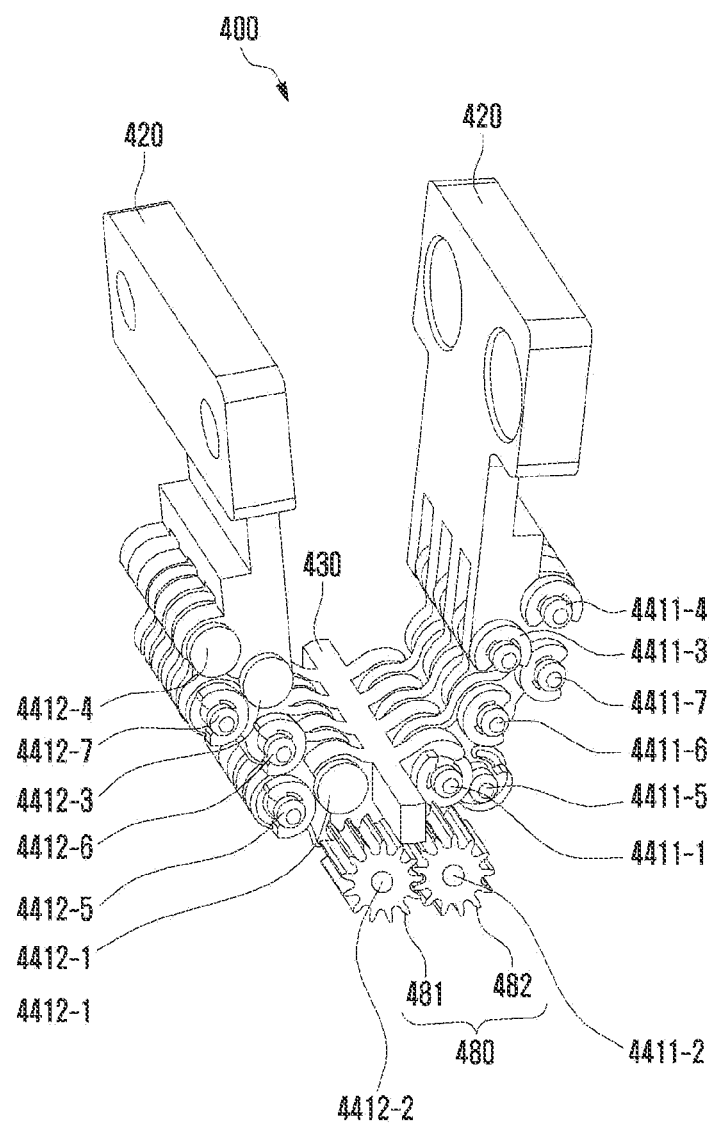
FIG. 6B is a view illustrating an operation state of the hinge according to various embodiments disclosed herein.
Figure 7A:
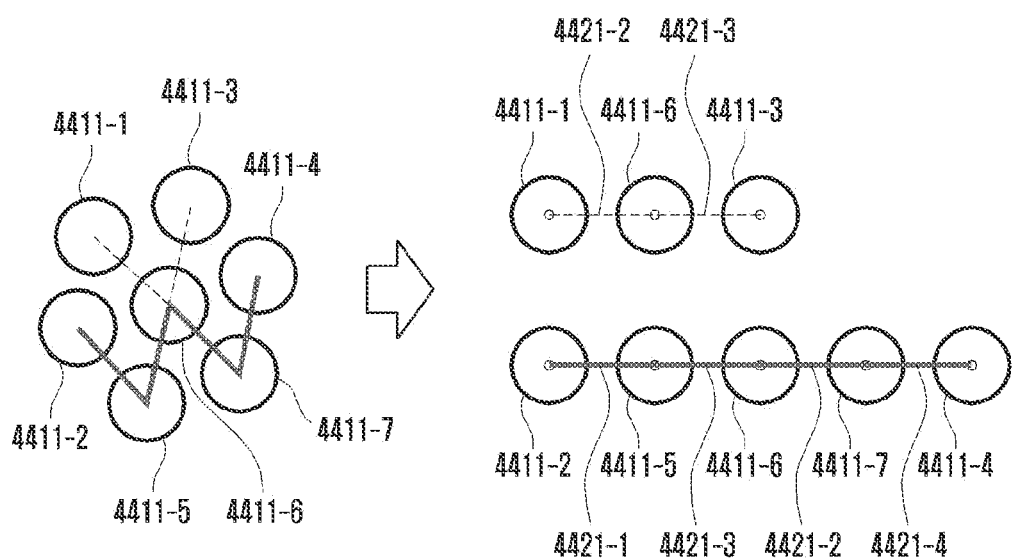
FIG. 7A is a conceptual view for describing a hinge according to various embodiments disclosed herein.
Figure 7B:
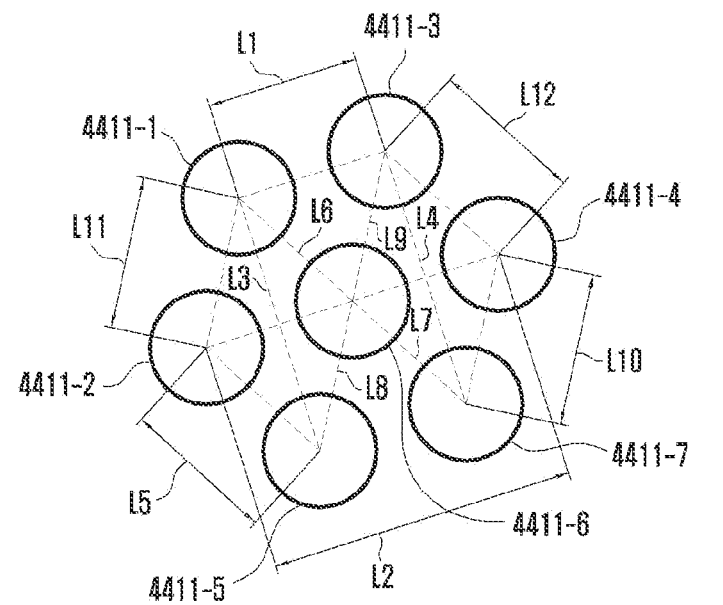
FIG. 7B is a conceptual view for describing the hinge according to various embodiments disclosed herein.
Figure 7B:
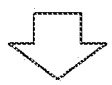
Figure 7B:
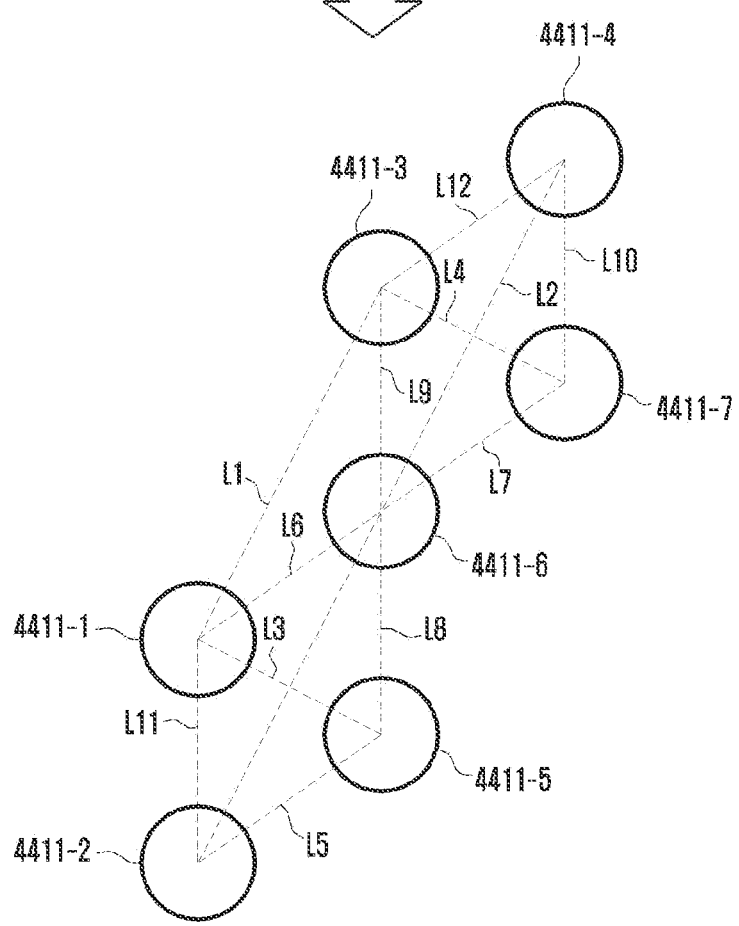
Figure 8A:
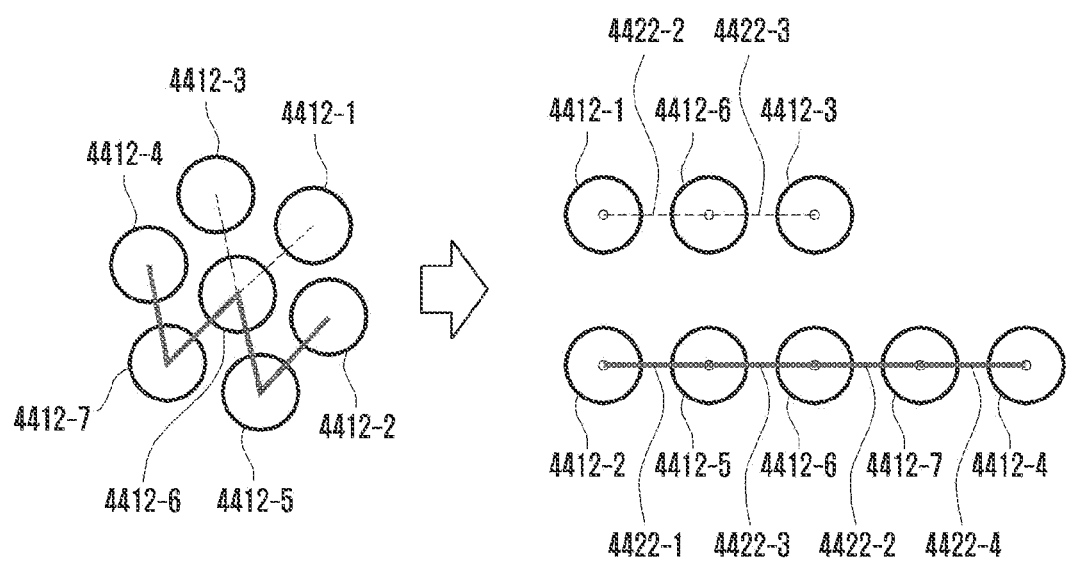
FIG. 8A is a conceptual view for describing a hinge according to various embodiments disclosed herein.
Figure 8B:
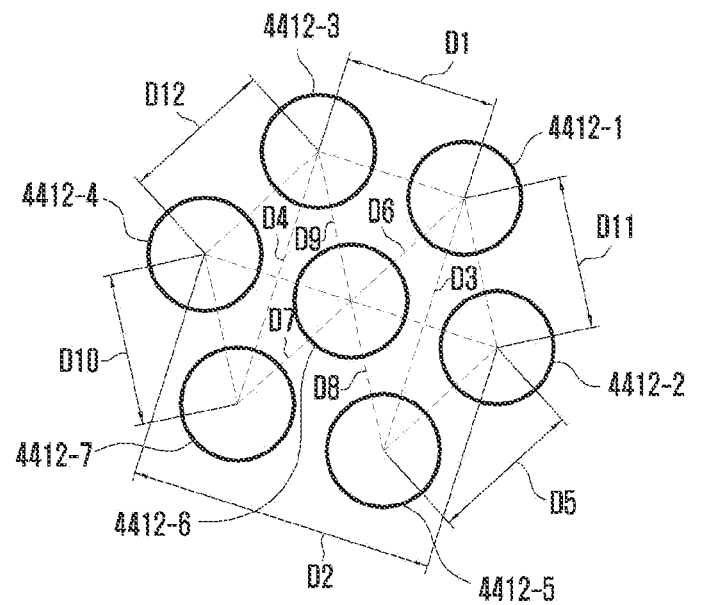
FIG. 8B is a conceptual view for describing a hinge according to various embodiments disclosed herein.
Figure 8B:
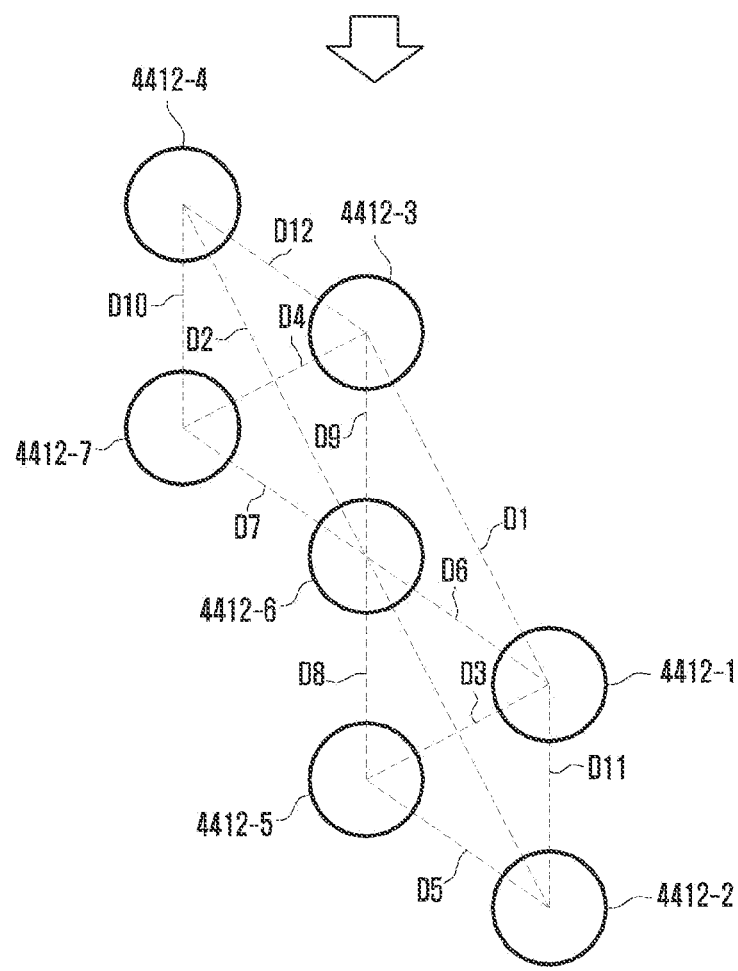

FIG. 6A is a view illustrating an operation state of a hinge according to various embodiments disclosed herein. FIG. 6B is a view illustrating an operation state of the hinge according to various embodiments disclosed herein. FIG. 7A is a conceptual view for describing a hinge according to various embodiments disclosed herein. FIG. 7B is a conceptual view for describing the hinge according to various embodiments disclosed herein. FIG. 8A is a conceptual view for describing a hinge according to various embodiments disclosed herein. FIG. 8B is a conceptual view for describing a hinge according to various embodiments disclosed herein. In the following description, the same reference numerals are used for components that perform the functions that are same as or substantially similar to those of the components described with reference to FIG. 3, FIGS. 4A and 4B, and FIG. 5, and detailed descriptions thereof will be omitted.

A hinge 400 according to various embodiments disclosed herein may foldably connect the first housing 310 and the second housing 320. The hinge 400 may include a first arm 410 coupled to the first housing 310 and a second arm 420 coupled to the second housing 320. When the first arm 410 and the second arm 420 rotate relative to the hinge bracket 430 of the hinge 400, the first housing 310 connected to the first arm 410 and the second housing 320 connected to the second arm 420 may be switched into a folded state or an unfolded state.

In certain embodiments, the display 340 included in the electronic device 300 may have a predetermined radius of curvature when deformed. The display 340 having the predetermined radius of curvature may be deformed around two deformation points. Since these deformation points exist within the area occupied by the display 340, the electronic device 300 may be limited to directly dispose a rotation shaft such as a shaft (e.g., the shaft 450 in FIG. 4B) in this portion. The hinge 400 according to various embodiments disclosed herein may provide a rotation trajectory of the display 340 through a rotation structure of a plurality of rotation shafts 441 and a plurality of links 442 by using the multi-link structure 401 without directly disposing a rotation shaft 441 at the deformation point of the display 340.

First, an operation of the hinge 400 related to the first arm 410 in the folding operation of the electronic device 300 will be described.

In the folding operation of the electronic device 300, the (1-3)th link 4421-3 and the (1-2)th link 4421-2 may rotate about the (1-2)th auxiliary rotation shaft 4411-6. When the (1-3)th link 4421-3 and the (1-2)th link 4421-2 rotate about the (1-2)th auxiliary rotation shaft 4411-6, the distance L3 between the first bracket rotation shaft 4411-1 and the (1-1)th auxiliary rotation shaft 4411-5 and the distance L4 between the (1-1)th arm rotation shaft 4411-3 and the (1-3)th auxiliary rotation shaft 4411-7 may be reduced (see FIG. 7B). In addition, the distance L1 between the first bracket rotation shaft 4411-1 and the (1-1)th arm rotation shaft 4411-3 may increase, and the distance L2 between the second bracket rotation shaft 4411-2 and the (1-2)th arm rotation shaft (4411-4) may increase.

In the process of folding the electronic device 300, the relative distance of the rotation shafts 441 connected by the same link 442 is constant, and the distance between the rotation shafts 441 connected by different links 442 is variable so that a folding trajectory may be formed. For example, the distance L5 between the second bracket rotation shaft 4411-2 and the (1-1)th auxiliary rotation shaft 4411-5 connected to the (1-1)th link 4421-1 may be unchanged in the folding process, the distances L6 and L7 between the first bracket rotation shaft 4411-1 and the (1-2)th auxiliary rotation shaft 4411-6 and the (1-3)th auxiliary rotation shaft 4411-7 connected to the (1-2)th link 4421-2 may be unchanged in the folding process, the distances L8 and L9 between the (1-1)th auxiliary rotation shaft 4411-5 and the (1-2)th auxiliary rotation shaft 4411-6 and the (1-1)th arm rotation shaft 4411-3 connected to the (1-3)th link 4421-3 may be unchanged during the folding process, and the distance L10 between the (1-3)th auxiliary rotation shaft 4411-7 and the (1-2)th arm rotation shaft 4411-4 connected to the (1-4)th link 4421-4 may be unchanged in the folding process. In addition, the distance L11 between the first bracket rotation shaft 4411-1 and the second bracket rotation shaft 4411-2, which are rotation shafts disposed in the hinge bracket 430, and the distance L12 between the (1-1)th arm rotation shaft 4411-3 and the (1-2)th arm rotation shaft 4411-4, which are rotation shafts disposed in the first arm 410, may be unchanged in the folding process.

Referring to FIG. 7A, the change in the distance between the second bracket rotation shaft 4411-2 and the (1-2)th arm rotation shaft 4411-4 in the folding process may be greater than the change in the distance between the first bracket rotation shaft 4411-1 and the (1-1)th arm rotation shaft 4411-3. The first bracket rotation shaft 4411-1 and the (1-1)th arm rotation shaft 4411-3 may be connected by the (1-2)th link 4421-2 and the (1-3)th link 4421-3. The second bracket rotation shaft 4411-2 and the (1-2)th arm rotation shaft 4411-4 may be connected by the (1-1)th link 4421-1, the (1-2)th link 4421-2, and the (1-3)th link 4421-3, and the (1-4)th link 4421-4. Since the number of the links 442 connecting the second bracket rotation shaft 4411-2 and the (1-2)th arm rotation shaft 4411-4 is greater than the number of the links 442 connecting the first bracket rotation shaft 4411-1 and the (1-1)th arm rotation shaft 4411-3, the change in the distance between the second bracket rotation shaft 4411-2 and the (1-2)th arm rotation shaft 4411-4 in the folding process may be greater than the change in the distance between the first bracket rotation shaft 4411-1 and the (1-1)th arm rotation shaft 4411-3.

In certain embodiments, a frictional force may act between the links 442 and the rotation shafts 441 and/or between the links 442 in the folding process. The (1-1)th link 4421-1 and (1-2)th link 4421-2 and the (1-3)th link 4421-3 and the (1-4)th link 4421-4 may be arranged in different rows (see FIG. 5A) to be in partial contact with each other. A frictional force may act in a portion in which the links 442 are in contact with each other. When an external force acting on the electronic device 300 is less than the sum of the frictional forces between the links 442, the electronic device 300 may stop in that state. The external force acting on the electronic device 300 may include, for example, a repulsive force of the display 340 and a self-weight rotational force due to gravity acting on the first housing 310 and the second housing 320. In other words, when an external force equal to or greater than a predetermined level is not applied, the process of folding the first housing 310 and the second housing 320 may be maintained in the stopped state. Due to the above-described frictional force, the electronic device 300 may be maintained in a state intermediate between the folded state and the unfolded state.

Next, an operation of the hinge 400 related to the second arm 420 in the folding operation of the electronic device 300 will be described.

In the folding operation of the electronic device 300, the (2-3)th link 4422-3 and the (2-2)th link 4422-2 may rotate about the (2-2)th auxiliary rotation shaft 4412-6. When the (2-3)th link 4422-3 and the (2-2)th link 4422-2 rotate about the (2-2)th auxiliary rotation shaft 4412-6, the distance D3 between the third bracket rotation shaft 4412-1 and the (2-1)th auxiliary rotation shaft 4412-5 and the distance D4 between the (2-1)th arm rotation shaft 4412-3 and the (2-3)th auxiliary rotation shaft 4412-7 may be reduced. In addition, the distance D1 between the third bracket rotation shaft 4412-1 and the (2-1)th arm rotation shaft 4412-3 may increase, and the distance D2 between the fourth bracket rotation shaft 4412-2 and the (2-2)th arm rotation shaft (4412-4) may increase.

In the process of folding the electronic device 300, the relative distance of the rotation shafts 441 connected by the same link 442 is constant, and the distance between the rotation shafts 441 connected by different links 442 is variable so that a folding trajectory may be formed. For example, the distance D5 between the fourth bracket rotation shaft 4412-2 and the (2-1)th auxiliary rotation shaft 4412-5 connected to the (2-1)th link 4422-1 may be unchanged in the folding process, the distances D6 and D7 between the third bracket rotation shaft 4412-1 and the (2-2)th auxiliary rotation shaft 4412-6 and the (2-3)th auxiliary rotation shaft 4412-7 connected to the (2-2)th link 4422-2 may be unchanged in the folding process, the distances D8 and D9 between the (2-1)th auxiliary rotation shaft 4412-5 and the (2-2)th auxiliary rotation shaft 4412-6 and the (2-1)th arm rotation shaft 4412-3 connected to the (2-3)th link 4422-3 may be unchanged during the folding process, and the distance D10 between the (2-3)th auxiliary rotation shaft 4412-7 and the (2-2)th arm rotation shaft 4412-4 connected to the (2-4)th link 4422-4 may be unchanged in the folding process. In addition, the distance D11 between the third bracket rotation shaft 4412-1 and the fourth bracket rotation shaft 4412-2, which are rotation shafts disposed in the hinge bracket 430, and the distance D12 between the (2-1)th arm rotation shaft 4412-3 and the (2-2)th arm rotation shaft 4412-4, which are rotation shafts disposed in the second arm 420, may be unchanged in the folding process.

Referring to FIG. 8A, the change in the distance between the fourth bracket rotation shaft 4412-2 and the (2-2)th arm rotation shaft 4412-4 in the folding process may be greater than the change in the distance between the third bracket rotation shaft 4412-1 and the (2-1)th arm rotation shaft 4412-3. The third bracket rotation shaft 4412-1 and the (2-1)th arm rotation shaft 4412-3 may be connected by the (2-2)th link 4422-2 and the (2-3)th link 4422-3. The second bracket rotation shaft 4411-2 and the (2-2)th arm rotation shaft 4412-4 may be connected by the (2-1)th link 4422-1, the (2-2)th link 4422-2, and the (2-3)th link 4422-3, and the (2-4)th link 4422-4. Since the number of the links 442 connecting the fourth bracket rotation shaft 4412-2 and the (2-2)th arm rotation shaft 4412-4 is greater than the number of the links 442 connecting the third bracket rotation shaft 4412-1 and the (2-1)th arm rotation shaft 4412-3, the change in the distance between the fourth bracket rotation shaft 4412-2 and the (2-2)th arm rotation shaft 4412-4 in the folding process may be greater than the change in the distance between the third bracket rotation shaft 4412-1 and the (2-1)th arm rotation shaft 4412-3.

In certain embodiments, a frictional force may act between the links 442 and the rotation shafts 441 and/or between the links 442 in the folding process. The (2-1)th link 4422-1 and (2-2)th link 4422-2 and the (2-3)th link 4422-3 and the (2-4)th link 4422-4 may be arranged in different rows (see FIG. 5A) to be in partial contact with each other. A frictional force may act between the links 442 in the portions in which the links 442 are in contact with each other. When an external force acting on the electronic device 300 is less than the sum of the frictional forces between the links 442, the electronic device 300 may stop in that state. The external force acting on the electronic device 300 may include, for example, a repulsive force of the display 340 and a self-weight rotational force due to gravity acting on the first housing 310 and the second housing 320. In other words, when an external force equal to or greater than a predetermined level is not applied, the process of folding the first housing 310 and the second housing 320 may be maintained in the stopped state. Due to the above-described frictional force, the electronic device 300 may be maintained in a state intermediate between the folded state and the unfolded state.

According to various embodiments, the rotation of the first arm 410 may be interlocked with the rotation of the second arm 420. The interlocking member 480 of the hinge 400 may cause the rotation of the first arm 410 to be interlocked with the rotation of the second arm 420. For example, the interlocking member 480 may include a first interlocking gear 481 connected to the second bracket rotation shaft 4411-2 and a second interlocking gear 482 connected to fourth bracket rotation shaft 4412-2 as illustrated in FIGS. 6A and 6B. The first interlocking gear 481 may be engaged with the second interlocking gear 482 to rotate. Since the first interlocking gear 481 is engaged with the second interlocking gear 482 to rotate, the second bracket rotation shaft 4411-2 and the fourth bracket rotation shaft 4412-2 may rotate in opposite directions. The first arm 410 and the second arm 420 may rotate in opposite directions with respect to the hinge bracket 430 due to the engagement and rotation of the first interlocking gear 481 and the second interlocking gear 482. In the process in which the electronic device 300 is switched into a folded state or an unfolded state, the rotation directions of the first arm 410 and the second arm 420 are opposite, and the interlocking member 480 is interlocked such that the first arm 410 and the second arm 420 rotate in opposite directions. Thus, the rotations of the first arm 410 and the second arm 420 may be interlocked by the interlocking member 480. The first interlocking gear 481 and the second interlocking gear 482 may be connected to rotation shafts 441 other than the second bracket rotation shaft 4411-2 and the fourth bracket rotation shaft 4412-2. For example, the first interlocking gear 481 may be connected to the first bracket rotation shaft 4411-1, and the second interlocking gear 482 may be connected to the third bracket rotation shaft 4412-1.

In the above, although the hinge 400 including the first arm 410 and the second arm 420 rotating relative to the hinge bracket 430 has been described, the second arm 420 may be omitted. The multi-link structure 401 may include only the components that rotate the first arm 410 relative to the hinge bracket 430. In this case, the second housing 320 may be fixed to the hinge housing 330, and only the first housing 310 may rotate relative to the hinge housing 330.

Figure 9A:
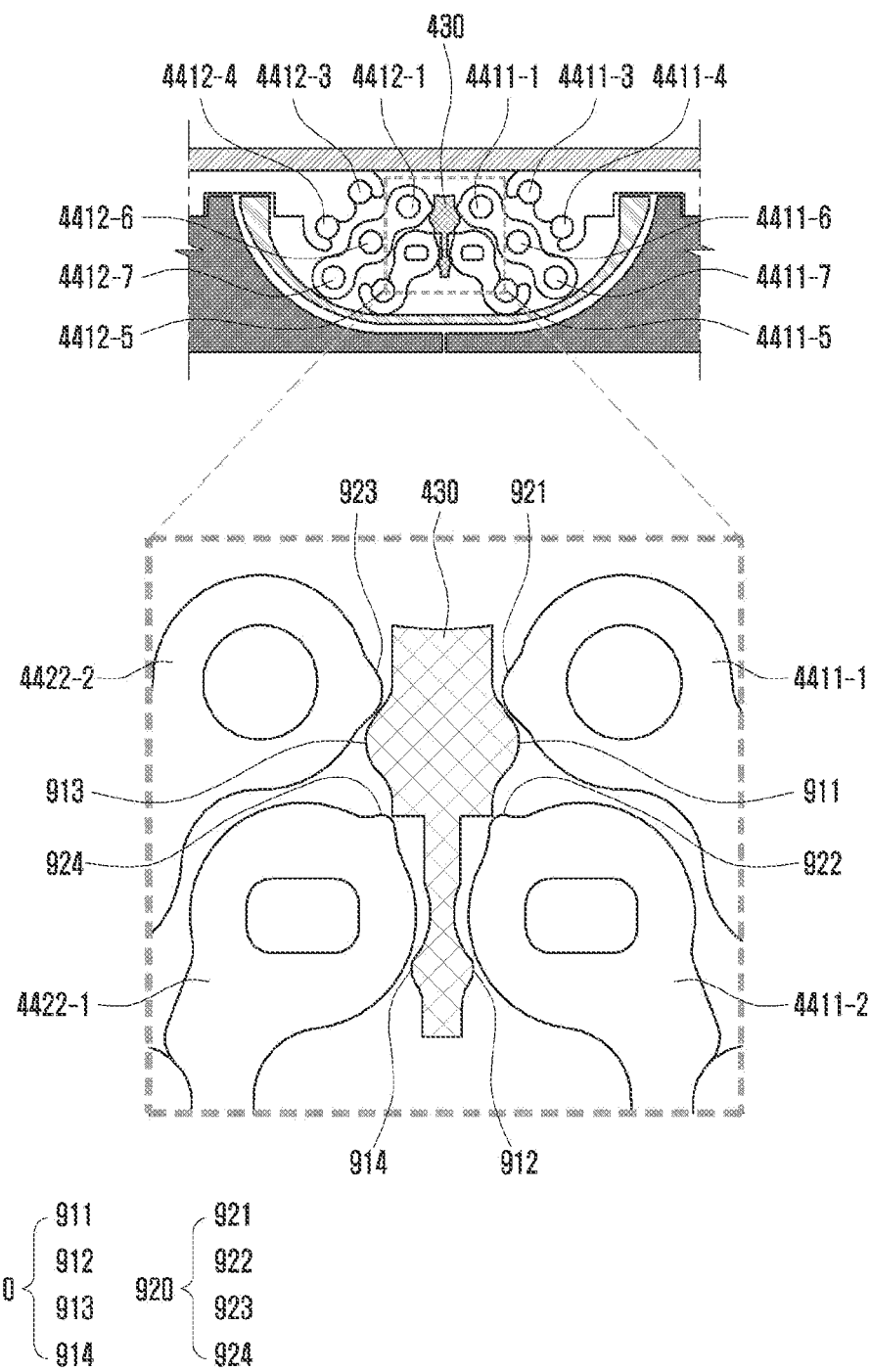
FIG. 9A is a view for describing an engagement structure of a hinge according to various embodiments disclosed herein.
Figure 9B:
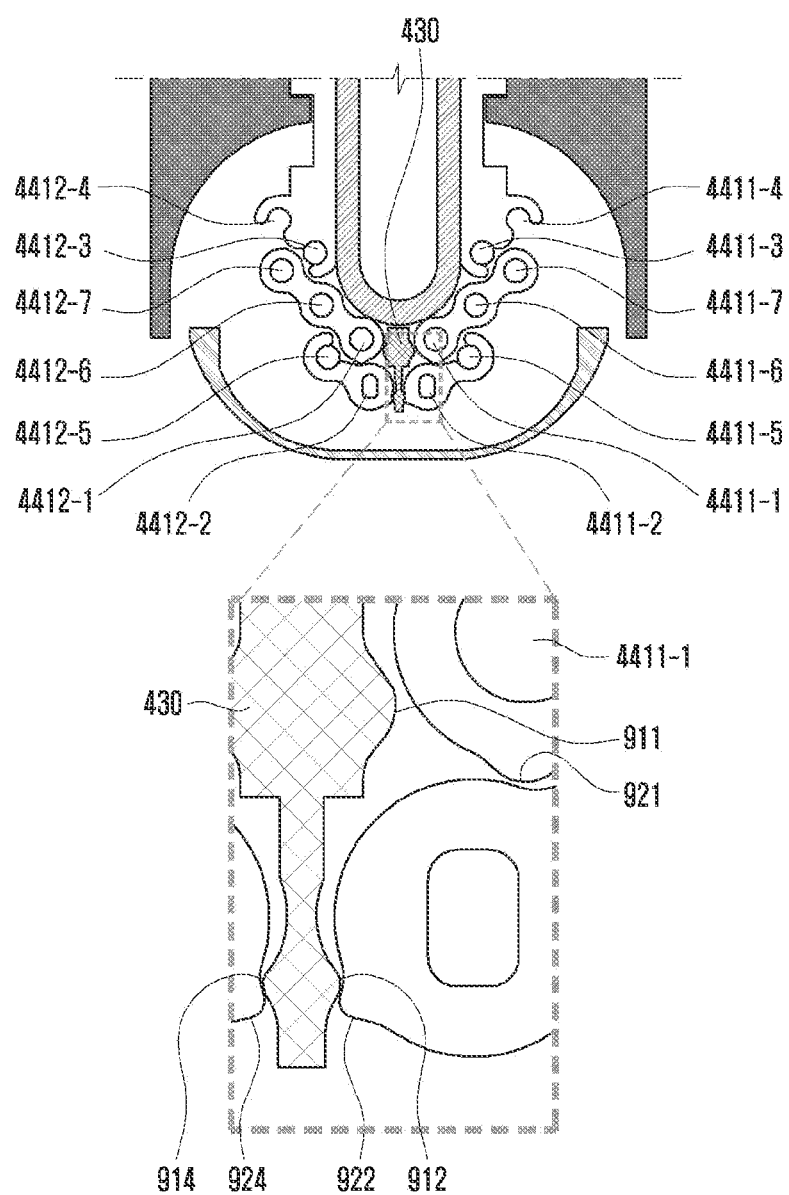
FIG. 9B is a view for describing an engagement structure of a hinge according to various embodiments disclosed herein.

FIG. 9A is a view for describing an engagement structure of a hinge according to various embodiments disclosed herein. FIG. 9B is a view for describing an engagement structure of a hinge according to various embodiments disclosed herein. In the following description, the same reference numerals are used for components that perform the functions that are same as or substantially similar to those of the components described with reference to FIG. 3, FIGS. 4A and 4B, and FIG. 5, and detailed descriptions thereof will be omitted.

According to various embodiments, the hinge 400 may include bracket protrusions 910 and link protrusions 920. When the electronic device 300 is in the folded state or the unfolded state, the bracket protrusions 910 and the link protrusions 920 may enable the electronic device 300 to be maintained in the folded state or the unfolded state unless an external force equal to or greater than a predetermined level acts on the electronic device 300.

Referring to FIG. 9A, the bracket protrusions 910 may be protrusions protruding to the outside of the hinge bracket 430. The bracket protrusions 910 may include a first bracket protrusion 911, a second bracket protrusion 912, a third bracket protrusion 913, and a fourth bracket protrusion 914. The link protrusions 920 may be protrusions protruding to the outside of the link 442. The link protrusions 920 may include a first link protrusion 921, a second link protrusion 922, a third link protrusion 923, and a fourth link protrusion 924. The first link protrusion 921 may be a protrusion provided on the (1-2)th link 4421-2 at a position adjacent to the first bracket rotation shaft 4411-1. The second link protrusion 922 may be a protrusion provided on the (1-1)th link 4421-1 at a position adjacent to the second bracket rotation shaft 4411-2. The third link protrusion 923 may be a protrusion provided on the (2-2)th link 4422-2 at a position adjacent to the third bracket rotation shaft 4412-1. The fourth link protrusion 924 may be a protrusion provided on the (2-1)th link 4422-1 at a position adjacent to the fourth bracket rotation shaft 4412-2.

Referring to FIG. 9A, when the electronic device 300 is in the unfolded state, the first link protrusion 921 may be engaged with the first bracket protrusion 911 in the direction of rotating into the folded state. In addition, the third link protrusion 923 may be engaged with the third bracket protrusion 913 in the direction of rotating into the folded state. When an external force equal to or greater than a predetermined level is not applied due to the engagement structure between the first link protrusion 921 and the first bracket protrusion 911 and the engagement structure between the third link protrusion 923 and the third bracket protrusion 913, the electronic device 300 can be maintained in the unfolded state.

Referring to FIG. 9B, when the electronic device 300 is in the folded state, the second link protrusion 922 may be engaged with the second bracket protrusion 912 in the direction of rotating into the unfolded state. In addition, the fourth link protrusion 924 may be engaged with the fourth bracket protrusion 914 in the direction of rotating into the unfolded state. When an external force equal to or greater than a predetermined level is not applied due to the engagement structure between the second link protrusion 922 and the second bracket protrusion 912 and the engagement structure between the fourth link protrusion 924 and the fourth bracket protrusion 914, the electronic device 300 can be maintained in the folded state.

The positions, numbers, and shapes of the bracket protrusions 910 and link protrusions 920 described above are merely examples, and the protrusion structures provided to maintain the folded state and the unfolded state of the electronic device 300 may be provided at various positions. In addition, by changing the shapes of the protrusions, it is possible to variously change the external force required to release the engagement. In addition, in order to improve the wear and engagement feeling of the protrusions, the material of the parts forming the bracket protrusions 910 and the link protrusions 920 may be made of various materials as well as metal.

Figure 10A:
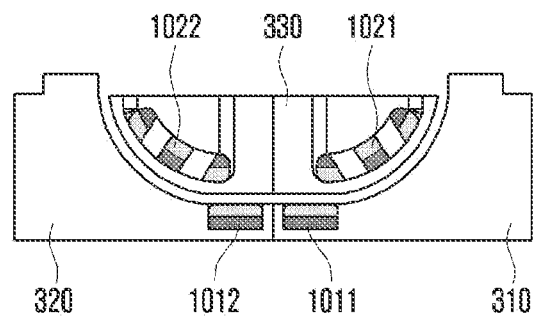
FIG. 10A is a view for describing magnets arranged in an electronic device according to various embodiments disclosed herein.
Figure 10A:
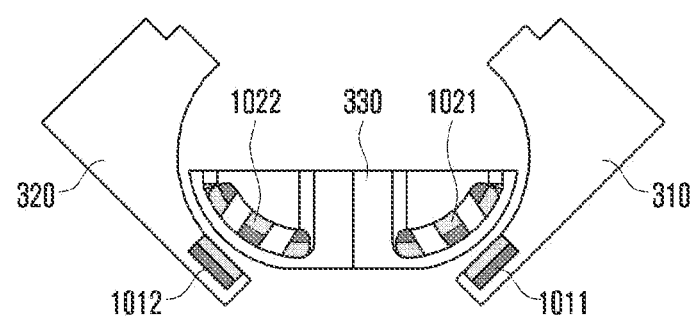
Figure 10A:
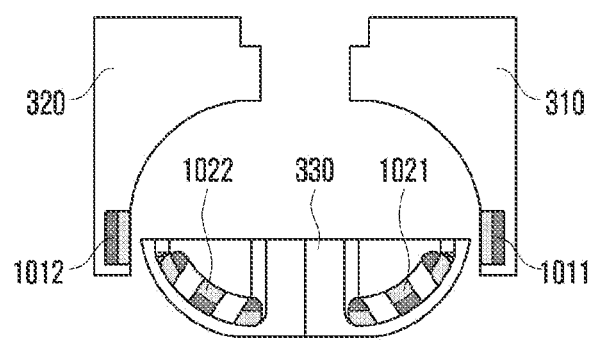
Figure 10B:
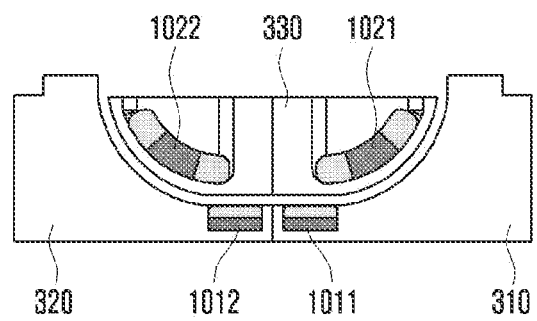
FIG. 10B is a view for describing magnets arranged in an electronic device according to various embodiments disclosed herein.
Figure 10B:
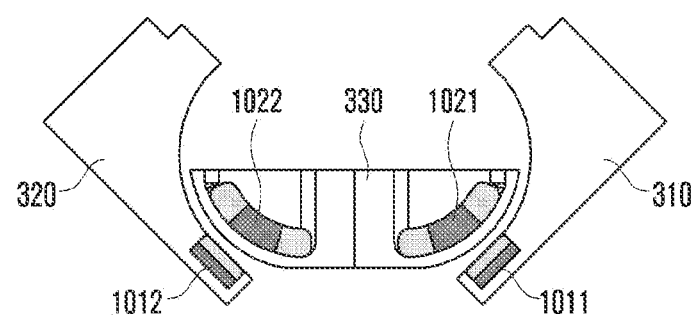
Figure 10B:
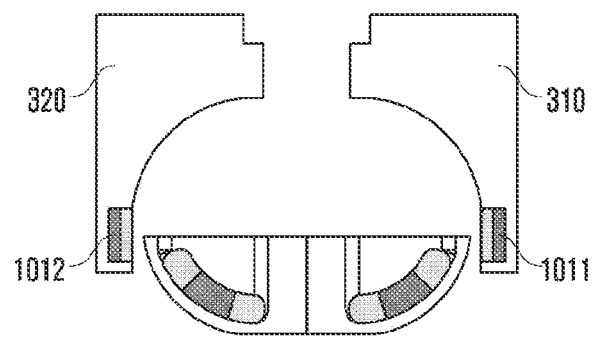
Figure 10C:
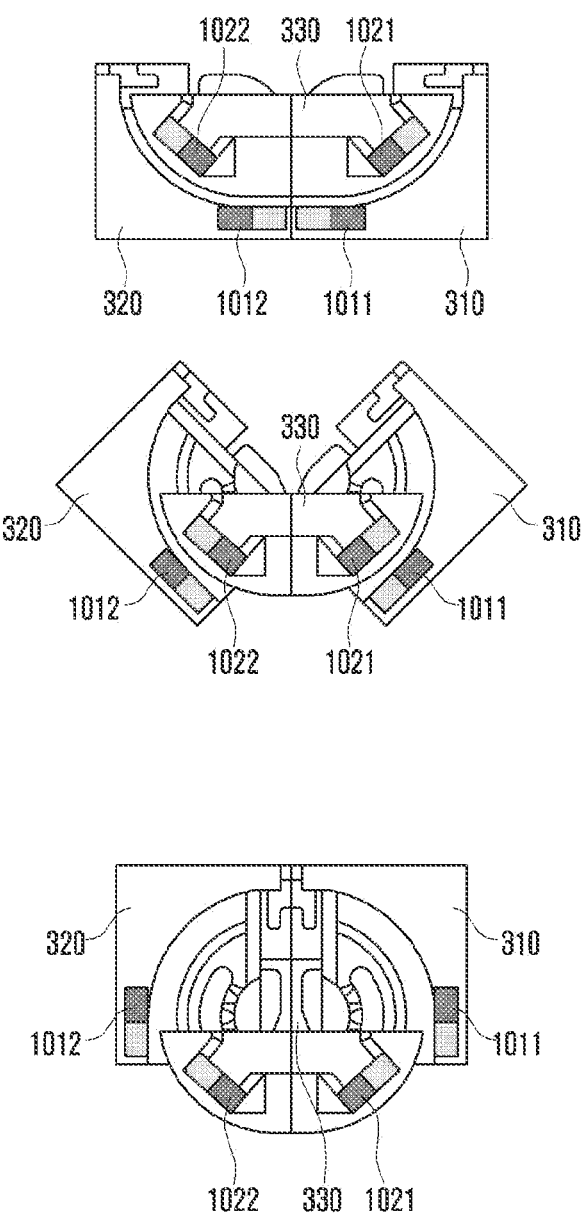
FIG. 10C is a view for describing magnets arranged in an electronic device according to various embodiments disclosed herein.

FIG. 10A is a view for describing magnets arranged in an electronic device according to various embodiments disclosed herein. FIG. 10B is a view for describing magnets arranged in an electronic device according to various embodiments disclosed herein. FIG. 10C is a view for describing magnets arranged in an electronic device according to various embodiments disclosed herein. In the following description, the same reference numerals are used for components that perform the functions that are same as or substantially similar to those of the components described with reference to FIG. 3, FIGS. 4A and 4B, and FIG. 5, and detailed descriptions thereof will be omitted.

According to various embodiments, the folding operation and unfolding operation of the electronic device 300 may be assisted by a magnetic force between the magnets 1011 and 1012 arranged in the first and second housings 310 and 320 and magnets 1021 and 1022 arranged in the hinge housing 330.

For example, referring to FIG. 10A, a first magnet 1011 may be arranged in the first housing 310, and a second magnet 1012 may be arranged in the second housing 320. The first housing 310 and the second housing 320 may partially overlap the hinge housing 330. The first magnet 1011 and the second magnet 1012 may be disposed in the overlapped portions of the first housing 310 and the second housing 320, respectively. A first hinge magnet 1021 corresponding to the first magnet 1011 and a second hinge magnet 1022 corresponding to the second magnet 1012 may be arranged in the hinge housing 330.

In certain embodiments, the first magnet 1011 and the first hinge magnet 1021 may be configured to repel each other when the electronic device 300 is in the folded state or the unfolded state. The second magnet 1012 and the second hinge magnet 1022 may be configured to repel each other when the electronic device 300 is in the folded state or the unfolded state. Since the first magnet 1011 and the second magnet 1012 arranged in the first housing 310 and the second housing 320 and the first hinge magnet 1021 and the second hinge magnet 1022 arranged on the hinge housing 330 repel each other in the folded state or the unfolded state, the electronic device 300 can be maintained in the folded state or the unfolded state unless an external force equal to greater than the repulsive force acts thereon.

In certain embodiments, the first magnet 1011 and the first hinge magnet 1021 may be arranged such that an attractive force acts in an intermediate state between the unfolded state and the folded state. The second magnet 1012 and the second hinge magnet 1022 may be arranged such that an attractive force acts in an intermediate state between the unfolded state and the folded state.

The first magnet 1011, the second magnet 1012, the first hinge magnet 1021, and the second hinge magnet 1022 may be configured in various forms. For example, as illustrated in FIG. 10A, the first hinge magnet 1021 may be segmented and disposed in the hinge housing 330, and the second hinge magnet 1022 may also be segmented and disposed in the hinge housing 330. As illustrated in FIG. 10B, the first hinge magnet 1021 and the second hinge magnet 1022 may be curved along the shape of the outer surface of the hinge housing 330. In addition, the first hinge magnet 1021 and the second hinge magnet 1022 may be have a bar shape, as illustrated in FIG. 10C.

An electronic device according to various embodiments disclosed herein may include a first housing (e.g., the first housing 310 in FIG. 3), a second housing (e.g., the second housing 320 in FIG. 3), and a hinge (e.g., the hinge 400 in FIG. 4A) configured to foldably connect the first housing and the second housing, wherein the hinge may include a hinge bracket (e.g., the hinge bracket 430 in FIG. 4B), a first arm (e.g., the first arm 410 in FIG. 4B) coupled to the first housing, and a multi-link structure (e.g., the multi-link structure 401 in FIG. 4B) including a plurality of rotation shafts (e.g., the rotation shafts 441 in FIG. 4B) and a plurality of links (e.g., the links 442 in FIG. 4B) connecting the plurality of rotation shafts, wherein the multi-link structure may be configured to rotatably connect the hinge bracket and the first arm.

In addition, the rotation shafts of the multi-link structure may include a plurality of bracket rotation shafts (e.g., the bracket rotation shafts 4411-1, 4411-2, 4412-1, and 4412-2 in FIG. 4B) inserted into bracket insertion holes (e.g., the bracket insertion holes 431, 432, 433, and 434 in FIG. 4B) provided at different positions in the hinge bracket, a plurality of first arm rotation shafts (e.g., the first arm rotation shafts 4411-3 and 4411-4 in FIG. 4B) inserted into first arm insertion holes (e.g., the first arm insertion holes 411 and 412 in FIG. 4B) provided at different positions in the first arm, and a first rotation shaft (e.g., the first rotation shaft 4411 in FIG. 4B) including a plurality of first auxiliary rotation shafts (e.g., the first auxiliary rotation shafts 4411-5, 4411-6, and 4411-7 in FIG. 4B), wherein the links of the multi-link structure may include a plurality of first links (e.g., the first links 4421 in FIG. 4B) connecting at least one of the plurality of bracket rotation shafts, the plurality of first auxiliary rotation shafts, and the plurality of first arm rotation shafts.

In addition, the bracket rotation shafts may include a first bracket rotation shaft (e.g., the first bracket rotation shaft 4411-1 in FIG. 4B) and a second bracket rotation shaft (e.g., the second bracket rotation shaft 4411-2 in FIG. 4B), the first arm rotation shafts may include a (1-1)th arm rotation shaft (e.g., the (1-1)th arm rotation shaft 4411-3 in FIG. 4B) and a (1-2)th arm rotation shaft (e.g., the (1-2)th arm rotation shaft in FIG. 4B), and the first auxiliary rotation shafts may include a (1-1)th auxiliary rotation shaft (e.g., the (1-1)th auxiliary rotation shaft 4411-5 in FIG. 4B), a (1-2)th auxiliary rotation shaft (e.g., the (1-2)th auxiliary rotation shaft 4411-6 in FIG. 4B), and a (1-3)th auxiliary rotation shaft (e.g., the (1-3)th auxiliary rotation shaft 4411-7 in FIG. 4B).

In addition, the first links may connect the rotation shafts such that, in a process of folding the first housing and the second housing, a distance between the first bracket rotation shaft and the (1-1)th arm rotation shaft and a distance between the second bracket rotation shaft and the (1-2)th arm rotation shaft increase and a distance between the first bracket rotation shaft and the (1-1)th auxiliary rotation shaft and a distance between the (1-1)th arm rotation shaft and the (1-3)th auxiliary rotation shaft decrease.

In addition, the first links may include a (1-1)th link (e.g., the (1-1)th link 4421-1 in FIG. 4B) connecting the second bracket rotation shaft and the (1-1)th auxiliary rotation shaft, a (1-2)th link (e.g., the (1-2)th link 4421-2 in FIG. 4B) connecting the first bracket rotation shaft, the (1-2)th auxiliary rotation shaft, and the (1-3)th auxiliary rotation shaft, a (1-3)th link (e.g., the (1-3)th link 4421-3 in FIG. 4B) connecting the (1-1)th auxiliary rotation shaft, the (1-2)th auxiliary rotation shaft, and the (1-1)th arm rotation shaft, and a (1-4)th link (e.g., the (1-4)th link 4421-4 in FIG. 4B) connecting the (1-3)th auxiliary rotation shaft, and the (1-2)th arm rotation shaft.

In addition, the first housing and the second housing may be switched between a folded state and an unfolded state by the hinge, and the hinge includes at least one bracket protrusion (e.g., the bracket protrusion 910 in FIG. 9A) provided on the hinge bracket and at least one link protrusion (e.g., the link protrusion 920 in FIG. 9A) provided on at least one of the plurality of links to be engaged with one of the at least one bracket protrusion in the folded state or the unfolded state.

In addition, the first housing and the second housing may be switched between a folded state and an unfolded state by the hinge, and the hinge may include a first bracket protrusion (e.g., the first bracket protrusion 911 in FIG. 9A) and a first link protrusion (e.g., the first link protrusion 921 in FIG. 9A), which are provided on the hinge bracket and the (1-2)th link, respectively, to be engaged with each other in a rotating direction from the unfolded state to the folded state, and a second bracket protrusion (e.g., the second bracket protrusion 912 in FIG. 9A) and a second link protrusion (e.g., the second link protrusion 922 of FIG. 9A), which are provided on the hinge bracket and the (1-1)th link, respectively, to be engaged with each other in a rotating direction from the folded state to the unfolded state.

In addition, a hinge housing (e.g., the hinge housing 330 in FIG. 3) disposed between the first housing and the second housing and configured to accommodate the hinge may be further included, wherein the first housing and the second housing may be switched between the folded state and the unfolded state by the hinge, a first magnet (e.g., the first magnet 1011 in FIG. 10A) disposed in the first housing and a first hinge magnet (e.g., the first hinge magnet 1021 in FIG. 10A) disposed in the hinge housing may be included, and the first magnet and the first hinge magnet may be arranged such that a repulsive force acts in the folded state and the unfolded state and an attractive force acts in the process of switching from the folded state to the unfolded state.

In addition, the hinge may include a second arm (e.g., the second arm 420 in FIG. 4B) coupled to the second housing, the rotation shafts of the multi-link structure may include a plurality of second arm rotation shafts (e.g., the second arm rotation shaft 4412-3 and 4412-4 in FIG. 4B) inserted into the second arm insertion holes (e.g., the second arm insertion holes 421 and 422 in FIG. 4B) provided at different positions in the second arm and a second rotation shaft (e.g., the second rotation shaft 4412 in FIG. 4B) including a plurality of second auxiliary rotation shafts (e.g., the second auxiliary rotation shafts 4412-5, 4412-6, and 4412-7 in FIG. 4B), and the links of the multi-link structure may include a plurality of second links (e.g., the second links 4422 in FIG. 4B) connecting at least one of the plurality of bracket rotation shafts, the plurality of second auxiliary rotation shafts, and the plurality of second arm rotation shafts.

In addition, the bracket rotation shafts may include a third bracket rotation shaft (e.g., the third bracket rotation shaft 4412-1 in FIG. 4B) and a fourth bracket rotation shaft (e.g., the fourth bracket rotation shaft 4412-2 in FIG. 4B), the second arm rotation shafts may include a (2-1)th arm rotation shaft (e.g., the (2-1)th arm rotation shaft 4412-3 in FIG. 4B) and a (2-2)th arm rotation shaft (e.g., the (2-2)th arm rotation shaft in FIG. 4B), and the second auxiliary rotation shafts may include a (2-1)th auxiliary rotation shaft (e.g., the (2-1)th auxiliary rotation shaft 4412-5 in FIG. 4B), a (2-2)th auxiliary rotation shaft (e.g., the (2-2)th auxiliary rotation shaft 4412-6 in FIG. 4B), and a (2-3)th auxiliary rotation shaft (e.g., the (2-3)th auxiliary rotation shaft 4412-7 in FIG. 4B).

In addition, in the electronic device, the second links connect the rotation shafts such that, in a process of folding the first housing and the second housing, a distance between the third bracket rotation shaft and the (2-1)th arm rotation shaft and a distance between the fourth bracket rotation shaft and the (2-2)th arm rotation shaft increase and a distance between the third bracket rotation shaft and the (2-1)th auxiliary rotation shaft and a distance between the (2-1)th arm rotation shaft and the (2-3)th auxiliary rotation shaft decrease.

In addition, the second links may include a (2-1)th link (e.g., the (2-1)th link 4422-1 in FIG. 4B) connecting the fourth bracket rotation shaft and the (2-1)th auxiliary rotation shaft, a (2-2)th link (e.g., the (2-2)th link 4422-2 in FIG. 4B) connecting the third bracket rotation shaft, the (2-2)th auxiliary rotation shaft, and the (2-3)th auxiliary rotation shaft, a (2-3)th link (e.g., the (2-3)th link 4422-3 in FIG. 4B) connecting the (2-1)th auxiliary rotation shaft, the (2-2)th auxiliary rotation shaft, and the (2-1)th arm rotation shaft, and a (2-4)th link (e.g., the (2-4)th link 4422-4 in FIG. 4B) connecting the (2-3)th auxiliary rotation shaft, and the (2-2)th arm rotation shaft.

In addition, a hinge housing (e.g., the hinge housing 330 in FIG. 3) disposed between the first housing and the second housing and configured to accommodate the hinge may be further included, wherein the first housing and the second housing may be switched between a folded state and an unfolded state by the hinge, and the hinge may include a third bracket protrusion (e.g., the third bracket protrusion 913 in FIG. 9A) and a third link protrusion (e.g., the third link protrusion 923 in FIG. 9A), which are provided on the hinge bracket and the (2-2)th link, respectively, to be engaged with each other in a rotating direction from the unfolded state to the folded state, and a fourth bracket protrusion (e.g., the fourth bracket protrusion 914 in FIG. 9A) and a fourth link protrusion (e.g., the fourth link protrusion 924 of FIG. 9A), which are provided on the hinge bracket and the (2-1)th link, respectively to be engaged with each other in a rotating direction from the folded state to the unfolded state.

In addition, a hinge housing (e.g., the hinge housing 330 in FIG. 3) disposed between the first housing and the second housing and configured to accommodate the hinge may be further included, wherein the first housing and the second housing may be switched between the folded state and the unfolded state by the hinge, a second magnet (e.g., the second magnet 1012 in FIG. 10A) disposed in the second housing and a second hinge magnet (e.g., the second hinge magnet 1022 in FIG. 10A) disposed in the hinge housing may be included, and the second magnet and the second hinge magnet may be arranged such that a repulsive force acts in the folded state and an attractive force acts in the process of switching from the folded state to the unfolded state.

In addition, the hinge may further include an interlocking member (e.g., the interlocking member 480 in FIG. 4B) configured to cause the rotation of the first arm to be interlocked with the rotation of the second arm.

In addition, the interlocking member may include gears (e.g., the gears 481 and 482 in FIG. 4B), which are connected to two of the bracket rotation shafts, respectively, and are engaged with each other.

An electronic device according to various embodiments disclosed herein may include a first housing (e.g., the first housing 310 in FIG. 3), a second housing (e.g., the second housing 320 in FIG. 3), a hinge (e.g., the hinge 400 in FIG. 4A) configured to foldably connect the first housing and the second housing, and a flexible display (e.g., the display 340 of FIG. 3) at least partially supported by the first housing and at least partially supported by the second housing and at least partially bent in the process of folding the first housing and the second housing, wherein the hinge may include a hinge bracket (e.g., the hinge bracket 430 in FIG. 4B), a first arm (e.g., the first arm 410 in FIG. 4B) coupled to the first housing, and a multi-link structure (e.g., the multi-link structure 401 in FIG. 4B) including a plurality of rotation shafts (e.g., the rotation shafts 441 in FIG. 4B) and a plurality of links (e.g., the links 442 in FIG. 4B) connecting the plurality of rotation shafts, wherein the multi-link structure may be configured to rotatably connect the hinge bracket and the first arm.

An electronic device according to various embodiments disclosed herein may include a first housing (e.g., the first housing 310 in FIG. 3), a second housing (e.g., the second housing 320 in FIG. 3), and a hinge (e.g., the hinge 400 in FIG. 4A) configured to foldably connect the first housing and the second housing, wherein the hinge may include a hinge bracket (e.g., the hinge bracket 430 in FIG. 4B), a first arm (e.g., the first arm 410 in FIG. 4B) coupled to the first housing, a second arm (e.g., the second arm 420 in FIG. 4B) coupled to the second housing, and a multi-link structure (e.g., the multi-link structure 401 in FIG. 4B) including a plurality of rotation shafts (e.g., the rotation shafts 441 in FIG. 4B) and a plurality of links (e.g., the links 442 in FIG. 4B) connecting the plurality of rotation shafts, wherein the multi-link structure may be configured to rotatably connect the hinge bracket and the first and second arms.

In addition, the rotation shafts of the multi-link structure may include a plurality of bracket rotation shafts (e.g., the bracket rotation shafts 4411-1, 4411-2, 4412-1, and 4412-2 in FIG. 4B) inserted into the bracket insertion holes provided at different positions in the hinge bracket, a plurality of first arm rotation shafts (e.g., the first arm rotation shafts (e.g., the first arm rotation shafts 4411-3 and 4411-4 in FIG. 4B) inserted into the first arm insertion holes 411 and 412 (e.g., the first arm insertion holes 411 and 412 in FIG. 4B) provided at different positions in the first arm, a plurality of second arm rotation shafts (e.g., the second arm rotation shafts 4412-3 and 4412-4 of FIG. 4B) inserted into second arm insertion holes (e.g., the second arm insertion holes 421 and 422 in FIG. 4B) provided at different positions in the second arm, a plurality of first auxiliary rotation shafts (e.g., the first auxiliary rotation shafts 4411-5, 4411-6, and 4411-7 in FIG. 4B), and a plurality of second auxiliary rotation shafts (e.g., the second auxiliary rotation shafts 4412-5, 4412-6, and 4412-7 in FIG. 4B), and the links of the multi-link structure may include a plurality of first links (e.g., the first links 4421 in FIG. 4B) connecting at least one of the plurality of bracket rotation shafts, the plurality of first auxiliary rotation shafts, and the plurality of first arm rotation shafts and a plurality of second links (e.g., the second links 4422 in FIG. 4B) connecting at least one of the plurality of bracket rotation shafts, the plurality of second auxiliary rotation shafts, and the plurality of second arm rotation shafts.

In addition, the hinge may further include an interlocking member (e.g., the interlocking member 480 in FIG. 4B) configured to cause the rotation of the first arm to be interlocked with the rotation of the second arm, and the interlocking member may include gears (e.g., the gears 481 and 482 in FIG. 4B) that are respectively connected to two of the bracket rotation shafts, respectively, and are engaged with each other.

The embodiments disclosed in the specification and drawings are provided merely to easily describe the technical features of the disclosure according to the embodiments disclosed herein and to help understanding of the embodiments disclosed herein and are not intended to limit the scope of the disclosure. Therefore, the scope of the various embodiments disclosed herein should be construed in such a manner that, in addition to the embodiments disclosed herein, all changes or modifications derived from the technical idea of the various embodiments are included in the scope of the various embodiments disclosed herein.

DESCRIPTION OF REFERENCE NUMERALS

310: first housing, 320: second housing, 340: display, 400: hinge

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a first housing;
a second housing; and
a hinge that foldably connects the first housing and the second housing,
wherein the hinge includes:
a hinge bracket;
a first arm coupled to the first housing;
a second arm coupled to the second housing; and
a multi-link structure comprising:
a first plurality of rotation shafts and a first plurality of links connecting the first plurality of rotation shafts and configured to rotatably connect the hinge bracket and the first arm; and
a second plurality of rotation shafts and a second plurality of links connecting the second plurality of rotation shafts and configured to rotatably connect the hinge bracket and the second arm,
wherein the hinge bracket comprises:
a body portion extending in a direction parallel to an axis of rotation of the first plurality of rotation shafts and an axis of rotation of the second plurality of rotation shafts;
at least two insertion holes for rotation shafts of the first plurality of rotation shafts; and
at least two insertion holes for rotation shafts of the second plurality of rotation shafts.

2. The electronic device of claim 1, wherein:
the rotation shafts of the multi-link structure include:
a plurality of bracket rotation shafts comprising a first bracket rotation shaft and a second bracket rotation shaft inserted into bracket insertion holes provided at different positions in the hinge bracket,
a plurality of first arm rotation shafts inserted into first arm insertion holes provided at different positions in the first arm, and
a first rotation shaft including a plurality of first auxiliary rotation shafts, and
the links of the multi-link structure include a plurality of first links connecting at least one of the plurality of bracket rotation shafts, the plurality of first auxiliary rotation shafts, and the plurality of first arm rotation shafts.

3. The electronic device of claim 2, wherein:
the bracket rotation shafts include a first bracket rotation shaft and a second bracket rotation shaft,
the first arm rotation shafts include a (1-1)th arm rotation shaft and a (1-2)th arm rotation shaft, and
the first auxiliary rotation shafts include a (1-1)th auxiliary rotation shaft, a (1-2)th auxiliary rotation shaft, and a (1-3)th auxiliary rotation shaft.

4. The electronic device of claim 3, wherein, in a process of folding the first housing and the second housing, links of the first plurality of links connect the rotation shafts such that:
a distance between the first bracket rotation shaft and the (1-1)th arm rotation shaft increases,
a distance between the second bracket rotation shaft and the (1-2)th arm rotation shaft increases,
a distance between the first bracket rotation shaft and the (1-1)th auxiliary rotation shaft decreases, and
a distance between the (1-1)th arm rotation shaft and the (1-3)th auxiliary rotation shaft decreases.

5. The electronic device of claim 3, wherein the first plurality of links include:
a (1-1)th link connecting the second bracket rotation shaft and the (1-1)th auxiliary rotation shaft,
a (1-2)th link connecting the first bracket rotation shaft, the (1-2)th auxiliary rotation shaft, and the (1-3)th auxiliary rotation shaft to each other,
a (1-3)th link connecting the (1-1)th auxiliary rotation shaft, the (1-2)th auxiliary rotation shaft, and the (1-1)th arm rotation shaft to each other, and
a (1-4)th link connecting the (1-3)th auxiliary rotation shaft and the (1-2)th arm rotation shaft.

6. The electronic device of claim 3, wherein:
the first housing and the second housing are switched between a folded state and an unfolded state by the hinge, and
the hinge includes:
at least one bracket protrusion provided on the hinge bracket, and
at least one link protrusion provided on at least one of the plurality of links to be engaged with one of the at least one bracket protrusion in the folded state or the unfolded state.

7. The electronic device of claim 5, wherein:
the first housing and the second housing are switched between a folded state and an unfolded state by the hinge, and
the hinge includes:
a first bracket protrusion and a first link protrusion, which are provided on the hinge bracket and the (1-2)th link, respectively, to engage with each other in a rotating direction from the folded state to the unfolded state, and
a second bracket protrusion and a second link protrusion, which are provided on the hinge bracket and the (1-1)th link, respectively, to engage with each other in a rotating direction from the folded state and the unfolded state.

8. The electronic device of claim 1, further comprising:
a hinge housing disposed between the first housing and the second housing and configured to accommodate the hinge,
a first magnet disposed in the first housing, and
a first hinge magnet disposed in the hinge housing,
wherein:
the first housing and the second housing are switched between a folded state and an unfolded state by the hinge, and
the first magnet and the first hinge magnet are disposed such that a repulsive force acts in the folded state and the unfolded state, and an attractive force acts in a process of switching from the folded state into the unfolded state.

9. The electronic device of claim 2, wherein:
the rotation shafts of the multi-link structure include:
a plurality of second arm rotation shafts inserted into second arm insertion holes provided at different positions in the second arm, and
a second rotation shaft including a plurality of second auxiliary rotation shafts, and
the links of the multi-link structure include a plurality of second links connecting at least one of the plurality of bracket rotation shafts, the plurality of second auxiliary rotation shafts, and the plurality of second arm rotation shafts.

10. The electronic device of claim 9, wherein:
the bracket rotation shafts include a third bracket rotation shaft and a fourth bracket rotation shaft, the second arm rotation shafts include a (2-1)th arm rotation shaft and a (2-2)th arm rotation shaft, and the second auxiliary rotation shafts include a (2-1)th auxiliary rotation shaft, a (2-2)th auxiliary rotation shaft, and a (2-3)th auxiliary rotation shaft.

11. The electronic device of claim 10, wherein, in a process of folding the first housing and the second housing, the second links connect the rotation shafts such that:

a distance between the third bracket rotation shaft and the (2-1)th arm rotation shaft increases, a distance between the fourth bracket rotation shaft and the (2-2)th arm rotation shaft increases, a distance between the third bracket rotation shaft and the (2-1)th auxiliary rotation shaft decreases, and a distance between the (2-1)th arm rotation shaft and the (2-3)th auxiliary rotation shaft decrease.

12. The electronic device of claim 10, wherein the second links include:

a (2-1)th link connecting the fourth bracket rotation shaft and the (2-1)th auxiliary rotation shaft, a (2-2)th link connecting the third bracket rotation shaft, the (2-2)th auxiliary rotation shaft, and the (2-3)th auxiliary rotation shaft to each other, a (2-3)th link connecting the (2-1)th auxiliary rotation shaft, the (2-2)th auxiliary rotation shaft, and the (2-1)th arm rotation shaft to each other, and a (2-4)th link connecting the (2-3)th auxiliary rotation shaft and the (2-2)th arm rotation shaft.

13. The electronic device of claim 12, further comprising:

a hinge housing disposed between the first housing and the second housing and configured to accommodate the hinge, wherein:

the first housing and the second housing is switched between a folded state and an unfolded state by the hinge, and the hinge includes:

a first bracket protrusion provided on the hinge bracket and a first link protrusion provided on the (2-2)th link to engage with each other in a rotating direction from the folded state to the unfolded state, and a second bracket protrusion provided on the hinge bracket and a second link protrusion provided on the (2-1)th link to engage with each other in a rotating direction from the folded state and the unfolded state.

14. The electronic device of claim 9, further comprising:

a hinge housing disposed between the first housing and the second housing and configured to accommodate the hinge, a magnet disposed in the second housing, and a first hinge magnet disposed in the hinge housing, wherein:

the first housing and the second housing are switched between a folded state and an unfolded state by the hinge, and the magnet and the first hinge magnet are disposed such that a repulsive force acts in the folded state and the unfolded state, and an attractive force acts in a process of switching the folded state into the unfolded state.

15. The electronic device of claim 9, wherein the hinge further includes an interlocking member configured to cause rotation of the first arm to interlock with rotation of the second arm.

16. The electronic device of claim 15, wherein the interlocking member includes gears that are connected to two of the bracket rotation shafts, respectively, and are engaged with each other.

17. An electronic device comprising:

a first housing;

a second housing;

a hinge configured to foldably connect the first housing and the second housing; and a flexible display at least partially supported by the first housing and the second housing and at least partially bent in a process of folding the first housing and the second housing, wherein the hinge includes:

a hinge bracket;

a first arm coupled to the first housing;

a second arm coupled to the second housing; and a multi-link structure comprising a first plurality of rotation shafts and a first plurality of links connecting the first plurality of rotation shafts and configured to rotatably connect the hinge bracket and the first arm; and a multi-link structure comprising a second plurality of rotation shafts and a second plurality of links connecting the second plurality of rotation shafts and configured to rotatably connect the hinge bracket and the second arm;

wherein the hinge bracket comprises:

a body portion extending in a direction parallel to an axis of rotation of the first plurality of rotation shafts and an axis of rotation of the second plurality of rotation shafts;

at least two insertion holes for rotation shafts of the first plurality of rotation shafts; and at least two insertion holes for rotation shafts of the second plurality of rotation shafts.

* * * * *